United States Patent
Tanaka

(10) Patent No.: US 9,608,546 B2
(45) Date of Patent: Mar. 28, 2017

(54) ACTUATOR

(71) Applicant: SEIKO EPSON CORPORATION, Tokyo (JP)

(72) Inventor: Hideki Tanaka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 279 days.

(21) Appl. No.: 14/418,678

(22) PCT Filed: Jul. 30, 2013

(86) PCT No.: PCT/JP2013/004617
§ 371 (c)(1),
(2) Date: Jan. 30, 2015

(87) PCT Pub. No.: WO2014/020905
PCT Pub. Date: Feb. 6, 2014

(65) Prior Publication Data
US 2015/0214860 A1    Jul. 30, 2015

(30) Foreign Application Priority Data
Aug. 3, 2012  (JP) .................................. 2012-173443

(51) Int. Cl.
*H02N 1/00* (2006.01)
*F03G 7/00* (2006.01)

(52) U.S. Cl.
CPC ............. *H02N 1/002* (2013.01); *F03G 7/005* (2013.01)

(58) Field of Classification Search
CPC ................................ H02N 1/002; F03G 7/005
(Continued)

(56) References Cited

U.S. PATENT DOCUMENTS 5,977,685 A * 11/1999 Kurita .................... C08G 18/10
310/311
7,211,937 B2 * 5/2007 Kornbluh ............... A63H 13/00
310/309
(Continued)

FOREIGN PATENT DOCUMENTS

JP    2005-224027 A    8/2005
JP    2014-033561 A    2/2013
(Continued)

*Primary Examiner* — John K Kim
(74) *Attorney, Agent, or Firm* — Oliff PLC

(57) ABSTRACT

An actuator includes a first deformable material layer, a second deformable material layer, and an intermediate layer provided between the first deformable material layer and the second deformable material layer. The first deformable material layer includes a first deformable material containing a first stimulus-responsive compound, which changes its molecular structure and also its color tone according to an oxidation-reduction reaction, a first polymeric material, a first electronically conductive substance having a light transmitting property, and a first electrolyte. The second deformable material layer includes a second deformable material containing a second stimulus-responsive compound, which changes its molecular structure and also its color tone according to an oxidation-reduction reaction, a second polymeric material, a second electronically conductive substance having a light transmitting property, and a second electrolyte. The intermediate layer inhibits electron transfer between the first deformable material layer and the second deformable material layer.

15 Claims, 7 Drawing Sheets

(58) Field of Classification Search
USPC .......................................... 310/300, 309, 311
IPC ........................................................ H02N 1/00
See application file for complete search history.

(56) References Cited

U.S. PATENT DOCUMENTS

| | | | |
|---|---|---|---|
| 9,316,211 B2* | 4/2016 | Tanaka ................... | F03G 7/005 |
| 2002/0039620 A1* | 4/2002 | Shahinpoor .............. | A61F 2/08 |
| | | | 427/2.12 |
| 2012/0161586 A1* | 6/2012 | Suda ....................... | F03G 7/005 |
| | | | 310/363 |
| 2012/0235543 A1* | 9/2012 | Suda ....................... | F03G 7/005 |
| | | | 310/363 |
| 2012/0326557 A1* | 12/2012 | Hino ....................... | F03G 7/005 |
| | | | 310/308 |
| 2013/0009514 A1* | 1/2013 | Asaka ..................... | B82Y 30/00 |
| | | | 310/300 |
| 2015/0214860 A1* | 7/2015 | Tanaka ................... | H02N 1/002 |
| | | | 310/309 |

FOREIGN PATENT DOCUMENTS

| | | |
|---|---|---|
| JP | 2013-171148 A | 9/2013 |
| JP | 2013-171193 A | 9/2013 |
| JP | 2014-031455 A | 2/2014 |
| JP | 2014-033559 A | 2/2014 |

\* cited by examiner

ACTUATOR

This application claims a priority to Japanese Patent Application No. 2012-173443 filed on Aug. 3, 2012 which is hereby expressly incorporated by reference in its entirety.

TECHNICAL FIELD

The present invention relates to an actuator.

BACKGROUND ART

Recently, in the medical field, micromachining field, etc., the necessity of compact actuators grows.

Such compact actuators are required to be small and also be driven at a low voltage. Various attempts have been made to realize such actuators driven at a low voltage (see, for example, PTL 1).

However, in the actuators in the related art, the driving voltage could not be sufficiently decreased, and a high voltage was required for deforming the actuators. Further, in the actuators in the related art, it was difficult to obtain a sufficiently large deformation amount (displacement amount).

CITATION LIST

Patent Literature

[PTL 1] JP-A-2005-224027

SUMMARY OF INVENTION

Technical Problem

An object of the invention is to provide an actuator which can be largely displaced at a low voltage, and the like.

Solution to Problem

The above object is achieved by the following invention.

An actuator according to the invention includes:

a first deformable material layer;

a second deformable material layer; and an intermediate layer provided between the first deformable material layer and the second deformable material layer, wherein the first deformable material layer includes a first deformable material containing a first stimulus-responsive compound, which changes its molecular structure and also its color tone according to an oxidation-reduction reaction, a first polymeric material, a first electronically conductive substance having a light transmitting property, and a first electrolyte, the second deformable material layer includes a second deformable material containing a second stimulus-responsive compound, which changes its molecular structure and also its color tone according to an oxidation-reduction reaction, a second polymeric material, a second electronically conductive substance having a light transmitting property, and a second electrolyte, and the intermediate layer inhibits electron transfer between the first deformable material layer and the second deformable material layer.

According to this, an actuator which can be largely displaced at a low voltage can be provided. Further, a deformation amount of the deformable material layer, an energy amount accumulated for deformation in the deformable material layer, etc. accompanying a change in the molecular structure due to the oxidation-reduction reaction of the stimulus-responsive compound can be easily determined according to the color tone of the deformable material layer.

It is preferred that in the actuator of the invention, the first electronically conductive substance and/or the second electronically conductive substance include/includes one member or two or more members selected from the group consisting of ITO, IZO, GZO, ZnO, CdO, AZO, and IGZO.

According to this, the function of transporting electrons is enhanced, and the deformable material layer (actuator) can be largely displaced at a relatively low voltage. Further, these materials can particularly stably maintain excellent transparency over a long period of time even in a variety of electronically conductive substances. Therefore, a change in the color tone (discoloration) of the stimulus-responsive compound described above can be more preferably determined over a longer period of time.

It is preferred that in the actuator of the invention, the first electronically conductive substance and/or the second electronically conductive substance are/is in the form of a particle.

According to this, the electronically conductive substance can be uniformly dispersed in the whole deformable material layer, and therefore, electrons can be favorably transported in the deformable material layer.

It is preferred that in the actuator of the invention, the first electronically conductive substance and/or the second electronically conductive substance have/has an average particle diameter of 5 nm or more and 10 µm or less.

According to this, electrons can be favorably transported in the deformable material layer, and therefore, the efficiency of supplying electrons to the stimulus-responsive compound can be particularly enhanced.

It is preferred that in the actuator of the invention, the first stimulus-responsive compound and/or the second stimulus-responsive compound include/includes:

a unit A which has a bond functioning as a rotation axis;

a first unit B which is disposed at a first bonding site of the unit A; and a second unit B which is disposed at a second bonding site of the unit A, and the first unit B and the second unit B are bonded to each other by a reduction reaction.

According to this, the response speed and the displacement amount of the stimulus-responsive compound (the deformable material and the actuator) can be particularly increased. Further, a change in the color tone due to the oxidation-reduction reaction becomes more evident, and therefore, it becomes possible to more easily and reliably recognize the degree of deformation or the like of the deformable material layer in appearance.

It is preferred that in the actuator of the invention, the unit A is one member selected from the group consisting of the following formula (1), the following formula (2), and the following formula (3).

[Chem. 1]

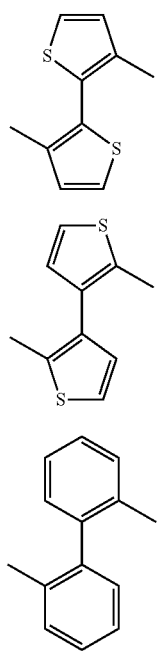

(1)

(2)

(3)

According to this, the stimulus-responsive compound can be deformed (displaced) more smoothly, and therefore, the actuator is driven at a lower voltage. Further, a change in the color tone due to the oxidation-reduction reaction becomes more evident, and therefore, it becomes possible to more easily and reliably recognize the degree of deformation or the like of the deformable material layer in appearance.

It is preferred that in the actuator of the invention, the first unit B and the second unit B are each a group represented by the following formula (4).

[Chem. 2]

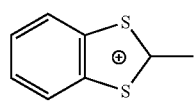

(4)

According to this, by adjusting the reaction conditions, the state of bonding between the units B can be reversibly and more easily switched from the bonding state to the non-bonding state. Further, due to high reactivity, the stimulus-responsive compound can be deformed more smoothly at a lower voltage. Further, a change in the color tone due to the oxidation-reduction reaction becomes more evident, and therefore, it becomes possible to more easily and reliably recognize the degree of deformation or the like of the deformable material layer in appearance.

It is preferred that in the actuator of the invention, the first polymeric material and/or the second polymeric material include/includes one member or two or more members selected from the group consisting of a vinylidene fluoride-propylene hexafluoride copolymer, poly(methyl(meth)acrylate), and an organic electrolyte oligomer.

According to this, the whole deformable material can be adjusted to have a most suitable hardness. Further, the deformable material (actuator) can be made to deform more flexibly, and thus to operate more smoothly. Further, in the case of the deformable material in the form of a gel, the ability to retain a solvent (a liquid component) can be particularly enhanced, and therefore, an undesirable decrease in the volume of the deformable material over time can be more effectively prevented. Further, a vinylidene fluoride-propylene hexafluoride copolymer, poly(methyl (meth)acrylate), and an organic electrolyte oligomer are each a material having particularly high transparency, and therefore, a change in the color tone (discoloration) of the stimulus-responsive compound can be more favorably determined.

It is preferred that in the actuator of the invention, the first polymeric material and/or the second polymeric material include/includes a liquid crystal polymer.

According to this, the response speed of the stimulus-responsive compound (deformable material) can be effectively increased. Further, the displacement of the whole deformable material accompanying the expansion and contraction of the stimulus-responsive compound can be more favorably amplified, and thus the displacement amount of the actuator as a whole can be particularly increased. Further, the liquid crystal polymer is generally a material having particularly high transparency, and therefore, a change in the color tone (discoloration) of the stimulus-responsive compound can be more favorably determined.

It is preferred that in the actuator of the invention, the liquid crystal polymer is obtained by cross-linking with a cross-linking agent.

According to this, the deformable material can be favorably solidified (gelled), and the shape stability and the handleability of the deformable material as a whole are particularly enhanced. Further, according to this, the deformable material (actuator) can more favorably achieve anisotropic expansion and contraction.

It is preferred that in the actuator of the invention, the first stimulus-responsive compound and/or the second stimulus-responsive compound include/includes a functional group having liquid crystallinity, and the liquid crystal polymer has the same functional group as that of the stimulus-responsive compound.

According to this, the response speed of the stimulus-responsive compound (deformable material) can be more effectively increased. Further, the displacement of the whole deformable material accompanying the expansion and contraction of the stimulus-responsive compound can be more favorably amplified, and thus the displacement amount of the actuator as a whole can be further increased. Further, the actuator can be deformed at a lower voltage. Further, the transparency of the deformable material can be particularly increased, and also a change in the color tone due to the oxidation-reduction reaction of the stimulus-responsive compound becomes more evident, and therefore, as a result, it becomes possible to more easily and reliably recognize the degree of deformation or the like of the deformable material layer in appearance.

It is preferred that in the actuator of the invention, the first stimulus-responsive compound and/or the second stimulus-responsive compound include/includes a functional group having liquid crystallinity.

According to this, the response speed of the stimulus-responsive compound (deformable material) can be more effectively increased. Further, the displacement of the whole deformable material accompanying the expansion and contraction of the stimulus-responsive compound can be more favorably amplified, and thus the displacement amount of the actuator as a whole can be particularly increased. Further, the actuator can be deformed at a lower voltage. Further, a change in the color tone due to the oxidation-reduction reaction becomes more evident, and therefore, it becomes possible to more easily and reliably recognize the degree of deformation or the like of the deformable material layer in appearance.

It is preferred that in the actuator of the invention, the functional group having liquid crystallinity has a plurality of ring structures, and one or more halogen atoms are bonded to one of the plurality of ring structures.

According to this, the motion performance when the functional groups having liquid crystallinity are oriented can be further enhanced, and thus, the speed of transition to the oriented state is further increased. As a result, the actuator can be deformed (displaced) more rapidly and smoothly, and thus can be driven at a lower voltage. Further, a change in the color tone due to the oxidation-reduction reaction becomes more evident, and therefore, it becomes possible to more easily and reliably recognize the degree of deformation or the like of the deformable material layer in appearance.

It is preferred that in the actuator of the invention, the intermediate layer is in the form of a gel.

According to this, the whole actuator can be made to deform more flexibly, and thus to operate more smoothly.

It is preferred that in the actuator of the invention, the intermediate layer includes an ion exchanger which exchanges anions.

According to this, the deformation amount of the actuator as a whole can be further increased.

DESCRIPTION OF EMBODIMENTS

Hereinafter, preferred embodiments of the invention will be described in detail.

Figure 1:
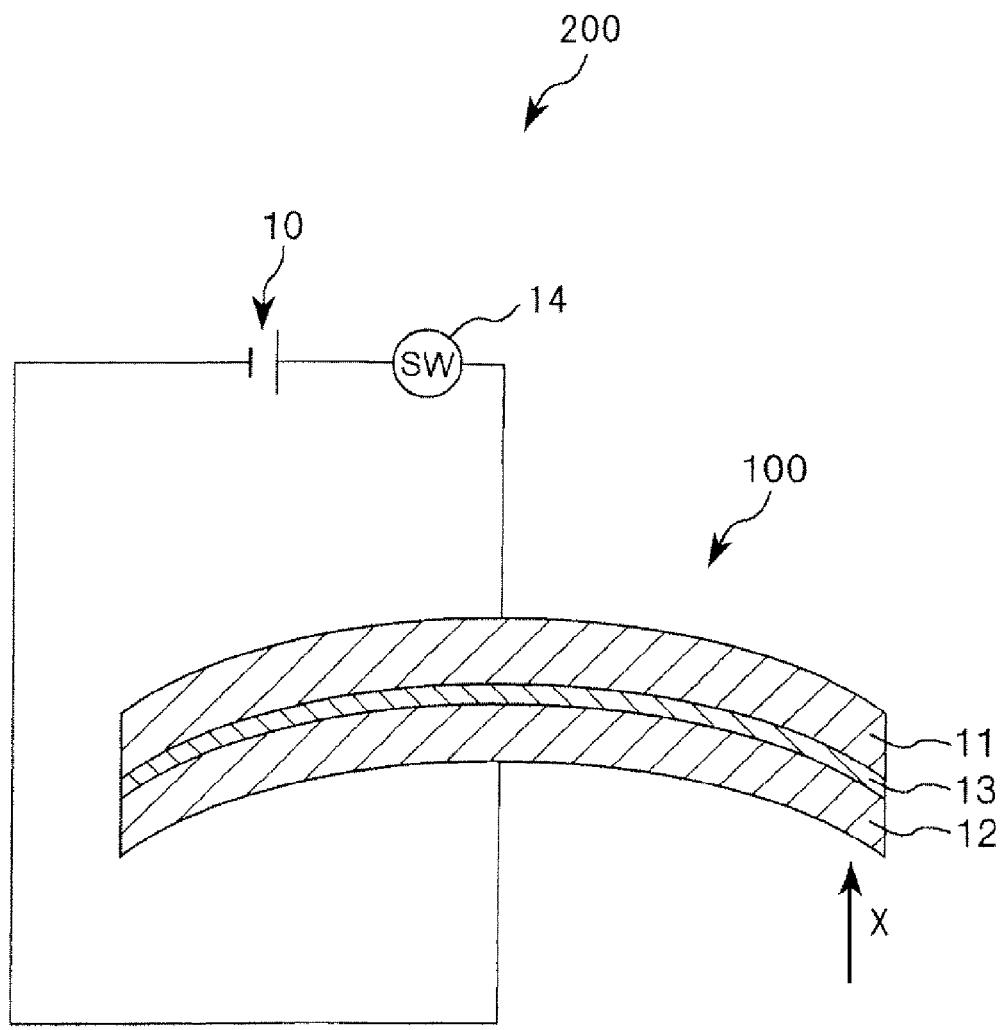
FIG. 1 is a cross-sectional view schematically showing a preferred embodiment of an actuator of the invention.
Figure 2:
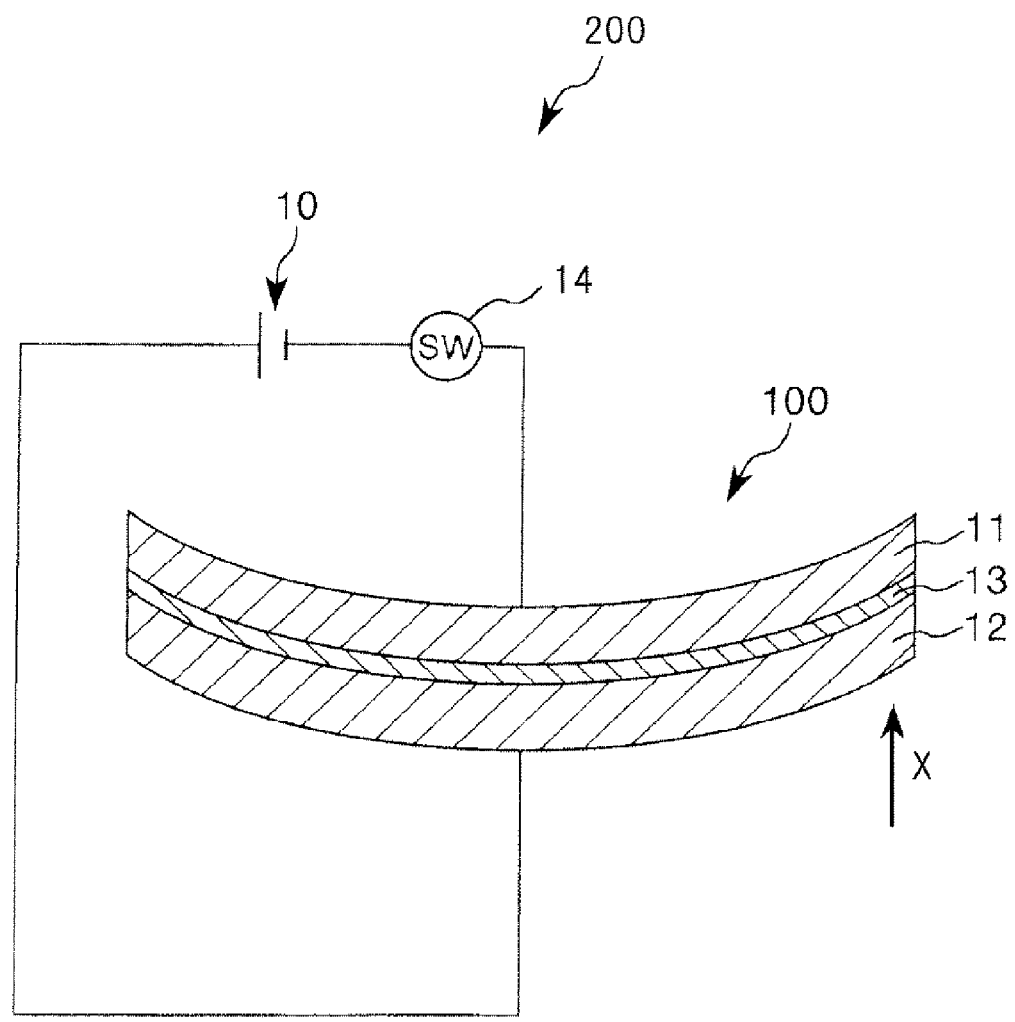
FIG. 2 is a cross-sectional view schematically showing a preferred embodiment of the actuator of the invention.
Figure 5A:
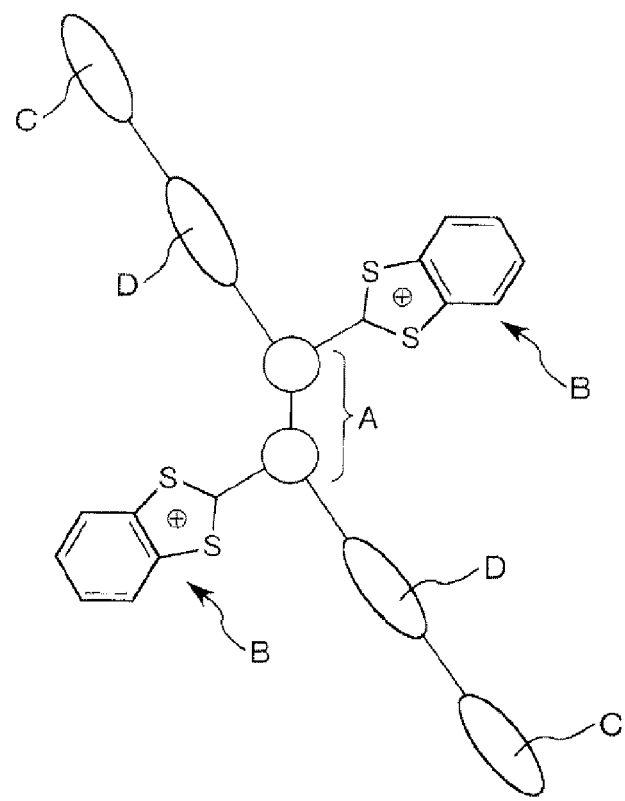
FIG. 5 shows views for illustrating the molecular structures of a stimulus-responsive compound constituting the actuator of the invention before and after an oxidation-reduction reaction.
Figure 5B:
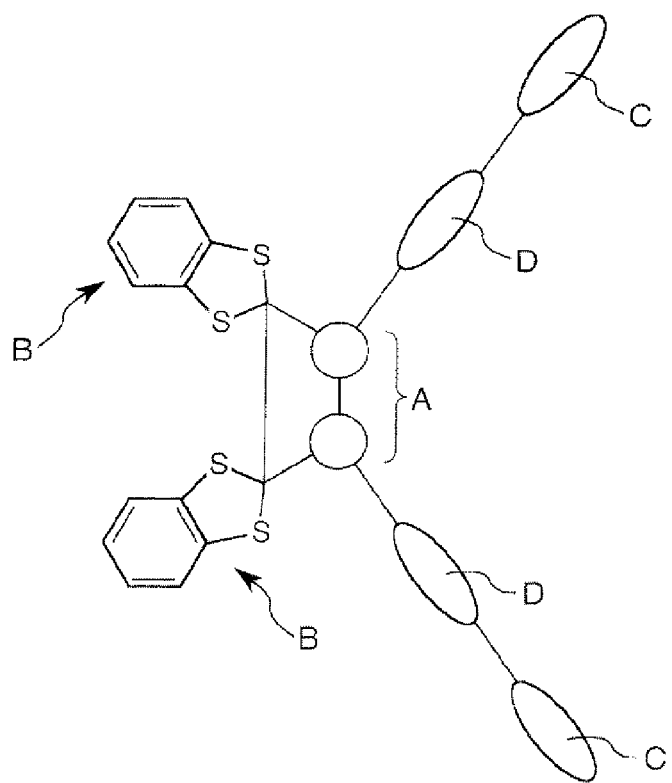
Figure 6A:
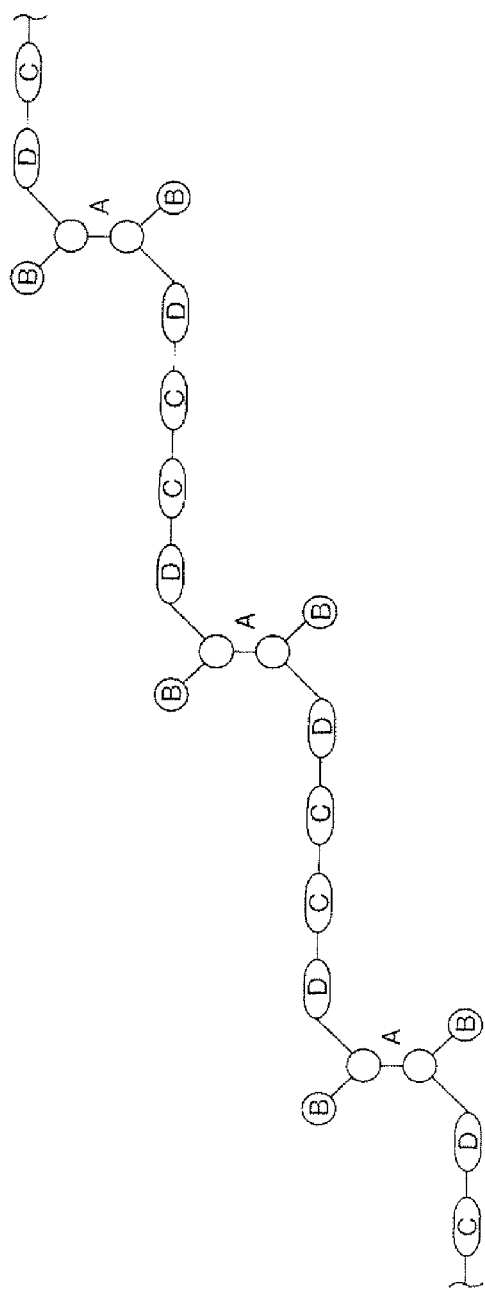
FIG. 6 shows views for illustrating the molecular structures of a stimulus-responsive compound constituting the actuator of the invention before and after an oxidation-reduction reaction.
Figure 6B:
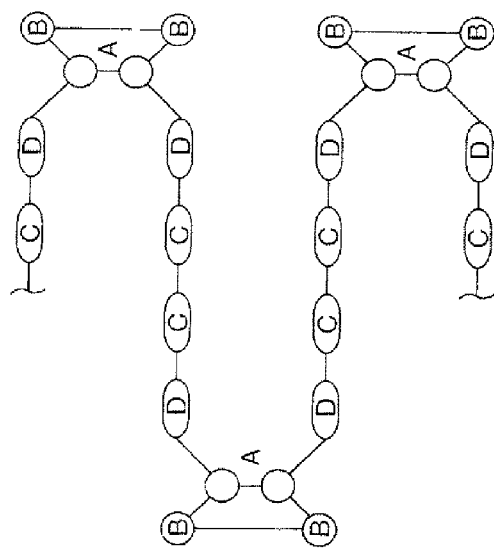

FIGS. 1 and 2 are cross-sectional views schematically showing a preferred embodiment of the actuator of the invention. FIGS. 3, 4, 5, and 6 are views for illustrating the molecular structures of a stimulus-responsive compound constituting the actuator of the invention before and after an oxidation-reduction reaction. FIGS. 3 and 4 show a stimulus-responsive compound which does not have a unit D described in detail below, and FIGS. 5 and 6 show a stimulus-responsive compound which has a unit D described in detail below. FIG. 5 corresponds to FIG. 3, and FIG. 6 corresponds to FIG. 4. In FIGS. 3, 4, 5, and 6, each open circle indicates a functional group (atomic group), and each line indicates a bond. Further, FIG. 7 shows cross-sectional views schematically showing the behavior of anions and a solvent in an intermediate layer constituting the actuator of the invention. FIG. 7($a$) shows a state in which an electric current is never applied to an actuator 100. FIGS. 7($b$) and 7($c$) show states in which an electric current is applied to the actuator 100, and FIG. 7($b$) corresponds to FIG. 1, and FIG. 7($c$) corresponds to FIG. 2.

As shown in FIGS. 1 and 2, the actuator 100 of this embodiment includes a first deformable material layer 11, a second deformable material layer 12, and an intermediate layer 13 provided between the first deformable material layer 11 and the second deformable material layer 12. Then, a driving device 200 is constituted by the actuator 100, a direct current power source 10, and a switch 14 which selects whether the actuator 100 is turned on or off, and the actuator 100 is connected to the power source 10 through the switch 14.

In the structure shown in FIG. 1, the first deformable material layer 11 is connected to the positive electrode of the power source 10 through the switch 14, and the second deformable material layer 12 is connected to the negative electrode of the power source 10. On the other hand, in the structure shown in FIG. 2, the first deformable material layer 11 is connected to the negative electrode of the power source 10 through the switch 14, and the second deformable material layer 12 is connected to the positive electrode of the power source 10.

Both of the first deformable material layer 11 and the second deformable material layer 12 are constituted by a deformable material containing a stimulus-responsive compound, which changes its molecular structure according to an oxidation-reduction reaction, and an electrolyte.

The intermediate layer 13 has a function of allowing ions of the electrolyte to pass therethrough. Further, the intermediate layer 13 has a function of inhibiting electron transfer between the first deformable material layer 11 and the second deformable material layer 12.

Hereinafter, the structure of the actuator 100 will be described in detail.

As shown in FIGS. 1 and 2, the actuator 100 of this embodiment includes the first deformable material layer 11, the second deformable material layer 12, and the intermediate layer 13 which is provided between the first deformable material layer 11 and the second deformable material layer 12 so as to be in contact with these layers.

<First Deformable Material Layer>

First, the first deformable material layer will be described.

The first deformable material layer 11 is constituted by a deformable material (a first deformable material) which contains a stimulus-responsive compound (a first stimulus-responsive compound), a polymeric material (a first polymeric material), an electronically conductive substance (a first electronically conductive substance), and an electrolyte (a first electrolyte). The first deformable material layer 11 may contain a solvent or the like.

The first deformable material layer 11 may be in any form such as a solid, a gel (semi-solid), or a liquid, but is preferably in the form of a gel (semi-solid). According to this, the handleability (ease of handling) of the deformable material is enhanced and also the range of application of the deformable material can be expanded. Further, the actuator 100 which deforms flexibly and operates smoothly can be provided.

Hereinafter, the respective components constituting the first deformable material will be described in detail.

<Stimulus-Responsive Compound>

First, the stimulus-responsive compound will be described.

The stimulus-responsive compound is a compound which has a function of deforming (displacing) the molecular conformation by stimulation (an oxidation-reduction reaction), in other words, a function of expanding and contracting the molecular chain, and also changes its color tone.

In the invention, the stimulus-responsive compound changes its molecular conformation according to an oxidation-reduction reaction. This compound can largely displace the whole deformable material at a relatively low voltage. As a result, for example, an actuator can obtain a sufficiently large displacement force and displacement amount at a low voltage. Further, the response speed of the actuator can be increased, and also the reproducibility of the deformation is excellent. Further, it is possible to reduce the weight of the actuator.

Further, in the invention, the stimulus-responsive compound also changes its color tone according to an oxidation-reduction reaction. In this manner, since the stimulus-responsive compound also changes its color tone according to an oxidation-reduction reaction, it is possible to determine the oxidized or reduced state of the stimulus-responsive compound according to the color tone of the stimulus-responsive compound (deformable material).

In the invention, the stimulus-responsive compound may be any as long as it changes its molecular structure and its color tone according to an oxidation-reduction reaction, but is preferably a compound including a functional group having liquid crystallinity. According to this, the response speed of the stimulus-responsive compound (deformable material) can be effectively increased. Further, the displacement of the whole deformable material accompanying the expansion and contraction of the stimulus-responsive compound can be more favorably amplified, and thus the displacement amount of the actuator 100 as a whole can be particularly increased. Further, the actuator 100 can be deformed at a lower voltage. In addition, a change in the color tone due to the oxidation-reduction reaction becomes more evident, and therefore, it becomes possible to more easily and reliably recognize the degree of deformation or the like of the first deformable material layer 11 in appearance. The "liquid crystallinity" as used herein refers to a property in which the molecular orientation direction can be changed by applying an electric field or a magnetic field.

In the case where the stimulus-responsive compound includes a functional group having liquid crystallinity, it is preferred that the functional group having liquid crystallinity has a plurality of ring structures, and one or more halogen atoms are bonded to one of the plurality of ring structures. According to this, the motion performance when the functional groups having liquid crystallinity are oriented can be further enhanced, and therefore, the speed of transition to the oriented state is further increased. As a result, the actuator 100 can be deformed (displaced) more rapidly and smoothly, and thus can be driven at a lower voltage. Further, a change in the color tone due to the oxidation-reduction reaction becomes more evident, and therefore, it becomes possible to more easily and reliably recognize the degree of deformation or the like of the first deformable material layer 11 in appearance.

The stimulus-responsive compound shown in FIG. 3(*a*) or the like has a unit A which has a bond functioning as a rotation axis, two units B (a first unit B and a second unit B) which are bonded to both ends (a first bonding site and a second bonding site) of the unit A, and two units C (a first unit C and a second unit C), and the first unit B and the second unit B are bonded to each other according to an oxidation-reduction reaction, and the first unit C and the second unit C are each a functional group having liquid crystallinity.

In this manner, because of having the unit A and the units B (the first unit B and the second unit B) satisfying a given positional relation, the response speed and the displacement amount of the stimulus-responsive compound (the deformable material and the actuator 100) can be particularly increased. Further, a change in the color tone due to the oxidation-reduction reaction becomes more evident, and therefore, it becomes possible to more easily and reliably recognize the degree of deformation or the like of the first deformable material layer 11 in appearance.

Because of having the units C (the first unit C and the second unit C) in addition to the unit A and the units B (the first unit B and the second unit B), the response speed of the stimulus-responsive compound (deformable material) can be effectively increased. Further, the displacement of the whole deformable material accompanying the expansion and contraction of the stimulus-responsive compound can be more favorably amplified, and thus the displacement amount of the deformable material as a whole can be particularly increased. Further, the deformable material can be deformed at a lower voltage. In addition, a change in the color tone due to the oxidation-reduction reaction becomes more evident, and therefore, it becomes possible to more easily and reliably recognize the degree of deformation or the like of the deformable material in appearance.

Hereinafter, the stimulus-responsive compound as shown in FIG. 3 will be mainly described.

The unit A constituting the stimulus-responsive compound is a group (unit) which has a bond functioning as a rotation axis and can rotate using the bond as an axis. Because of having such a unit, the stimulus-responsive compound can be deformed (displaced).

As the unit A, for example, a group in which two aromatic rings are bonded to each other can be used, however, in particular, one group selected from the group consisting of the following formula (1), the following formula (2), and the following formula (3) is preferred. According to this, the stimulus-responsive compound can be deformed (displaced) more smoothly, and as a result, the actuator 100 is driven at a lower voltage. Further, a change in the color tone due to the oxidation-reduction reaction becomes more evident, and therefore, it becomes possible to more easily and reliably recognize the degree of deformation or the like of the first deformable material layer 11 in appearance.

[Chem. 3]

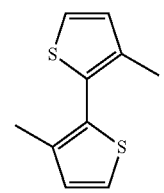

(1)

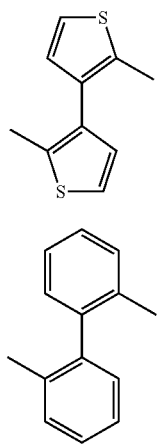

(2)

(3)

Figure 3A:
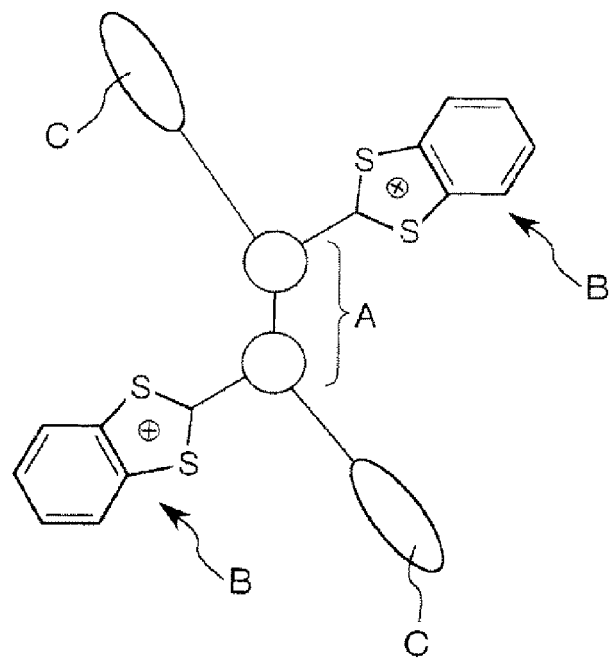
FIG. 3 shows views for illustrating the molecular structures of a stimulus-responsive compound constituting the actuator of the invention before and after an oxidation-reduction reaction.

As shown in FIG. 3(a), the units B (the first unit B and the second unit B) are groups which are bonded to both ends of the unit A (the first bonding site and the second bonding site of the unit A) in the direction of the rotation axis of the unit A. That is, the first unit B is bonded to the first bonding site of the unit A and the second unit B is bonded to the second bonding site of the unit A.

Figure 3B:
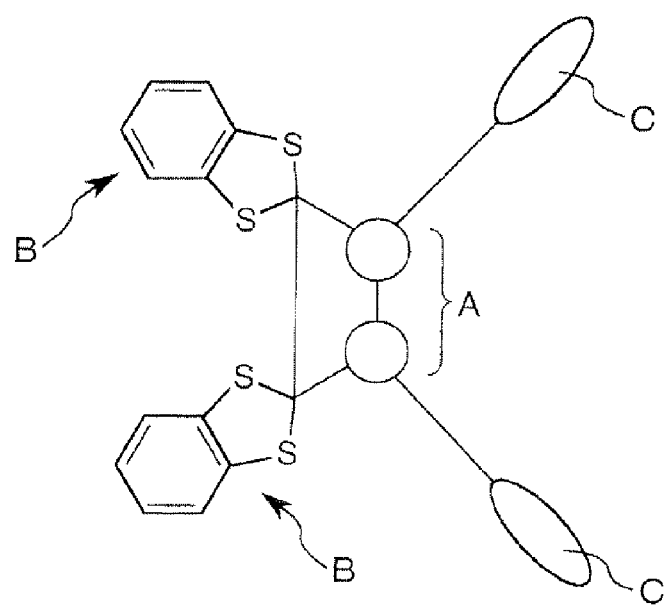

Further, the units B are groups which form a bond between the units B according to an oxidation-reduction reaction (see FIG. 3(b)). In other words, the units B are groups which form a bond by receiving an electron from the outside (by being reduced), and also are groups which dissociate the bond by releasing an electron to the outside (by being oxidized). Such an oxidation-reduction reaction can be allowed to proceed by, for example, applying a voltage. Further, by stopping the application of the voltage, the oxidation-reduction reaction can be stopped, and as a result, it becomes possible to maintain the shape of the deformable material.

In particular, as shown in FIG. 3, in the case where the stimulus-responsive compound is a compound which is extended (expanded) and also is positively charged by an oxidation reaction, the following effect is obtained.

That is, due to the extension (expansion) of the stimulus-responsive compound per se, the volume of the whole first deformable material layer 11 is increased, and an extending (expanding) effect is obtained, and also the positively charged stimulus-responsive compound molecules electrostatically repel one another, and therefore, an effect that the volume of the whole first deformable material layer 11 is increased at a ratio larger than the ratio of increase in the volume of the stimulus-responsive compound molecules is obtained. Further, when an oxidation reaction proceeds, anions derived from an electrolyte described in detail below flow in the first deformable material layer 11, and therefore, the volume of the first deformable material layer 11 is increased by an amount corresponding to the volume of the anions (for example, $BF_4^-$ or the like). Since the effects of these synergistically interact with each other, the volume of the first deformable material layer 11 when an oxidation reaction occurs can be particularly efficiently increased. On the other hand, when a reduction reaction proceeds, the stimulus-responsive compound per se is contracted, and moreover, electrostatic repulsion and inflow of ions as described above do not occur, and therefore, the ratio of expansion and contraction of the first deformable material layer 11 can be increased. Accordingly, as shown in FIG. 3, in the case where the stimulus-responsive compound is a compound which is extended (expanded) and also is positively charged by an oxidation reaction, the deformation amount of the first deformable material layer 11 as a whole can be increased. As a result, the deformation amount of the actuator 100 as a whole can be further increased, and also the actuator 100 can be driven at a lower voltage.

The units B (the first unit B and the second unit B) are not particularly limited as long as the units B (the first unit B and the second unit B) are groups which form a bond between the units B according to an oxidation-reduction reaction. However, the units B (the first unit B and the second unit B) are preferably groups represented by the following formula (4). According to this, by adjusting the reaction conditions, the state of bonding between the units B can be reversibly and more easily switched from the bonding state to the non-bonding state. Further, due to high reactivity, the stimulus-responsive compound can be deformed more smoothly at a lower voltage. Further, a change in the color tone due to the oxidation-reduction reaction becomes more evident, and therefore, it becomes possible to more easily and reliably recognize the degree of deformation or the like of the first deformable material layer 11 in appearance.

[Chem. 4]

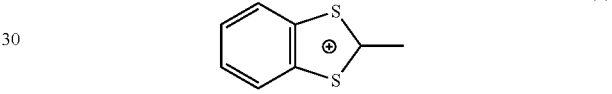

(4)

Further, in the case where the unit A is one group selected from the group consisting of the above formula (1), the above formula (2), and the above formula (3), and the units B (the first unit B and the second unit B) are groups represented by the above formula (4), a change in the color tone due to the oxidation-reduction reaction becomes more evident, and therefore, it becomes possible to more easily and reliably recognize the degree of deformation or the like of the deformable material in appearance.

The units C (the first unit C and the second unit C) are groups having liquid crystallinity. Because of having liquid crystallinity, when an electric field or a magnetic field is applied to the units C, the units C are oriented in a predetermined direction. As a result, the stimulus-responsive compound exhibits a given directionality with respect to the driving.

The units C (the first unit C and the second unit C) are not particularly limited as long as they are groups having liquid crystallinity, and examples thereof include a group having a plurality of ring structures such as a group in which a plurality of aromatic rings (such as phenyl groups) are linked to one another through an ester group, and a group in which aromatic rings (such as benzene rings) or cyclohexane rings are directly linked to one another. Further, particularly, the group having a plurality of ring structures preferably contains two or more aromatic rings. According to this, the response speed of the stimulus-responsive compound (deformable material) can be effectively increased. Further, the displacement of the whole deformable material accompanying the expansion and contraction of the stimulus-responsive compound can be more favorably amplified, and thus the displacement amount of the deformable material as a whole can be particularly increased. Further, the deformable material can be deformed at a lower voltage. In addition, a change in the color tone due to the oxidation-reduction reaction becomes more evident, and therefore, it becomes possible to more easily and reliably recognize the degree of deformation or the like of the deformable material in appearance.

It is particularly preferred to use groups in which one or more halogen atoms are bonded to one of the plurality of ring structures as the units C. According to this, the motion performance when the units C are oriented can be further enhanced, and therefore, the motion speed is further increased. As a result, the deformable material can be deformed (displaced) more rapidly and smoothly, and thus can be driven at a lower voltage. Further, a change in the color tone due to the oxidation-reduction reaction becomes more evident, and therefore, it becomes possible to more easily and reliably recognize the degree of deformation or the like of the deformable material in appearance.

The units C (the first unit C and the second unit C) may have a polymerizable functional group. By polymerizing the stimulus-responsive compound through this polymerizable functional group, the stimulus-responsive compound having a longer molecular chain can be formed. Further, by extending the molecular chain in this manner, as described in detail below, the degree of deformation (displacement) of the molecule can be increased, and it becomes possible to perform driving by a stronger force (stress).

Specific examples of the units C (the first unit C and the second unit C) can include the following groups.

[Chem. 5]

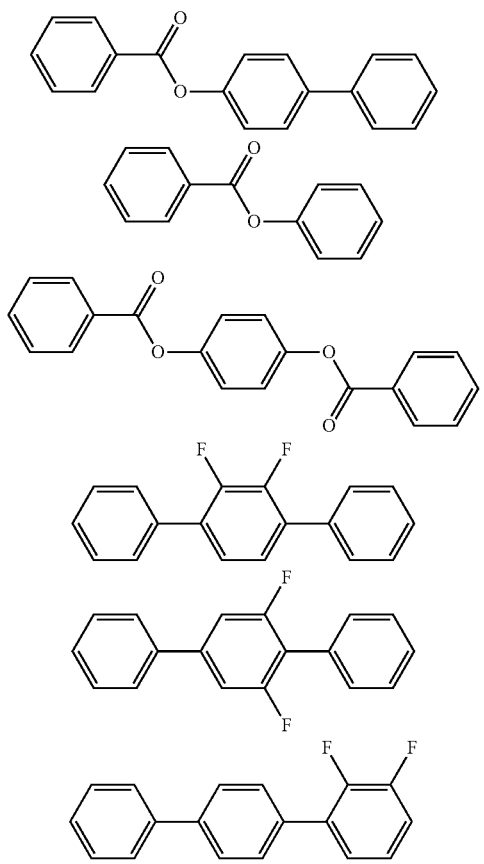

(5)

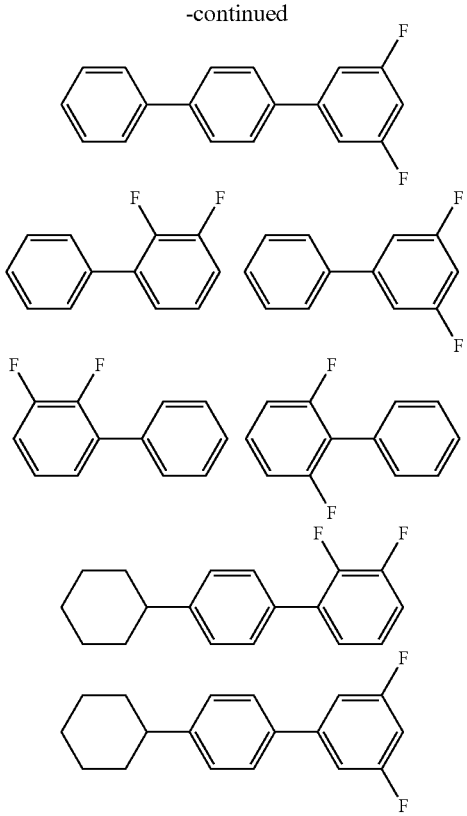

The unit C may be bonded to any site in the molecule of the stimulus-responsive compound, and for example, may be bonded to the unit B, but is preferably bonded to the unit A. In particular, in the case where two units C (a first unit C and a second unit C) are contained in the molecule, it is preferred that the first unit C is disposed at a third bonding site (a site different from the first and second bonding sites) of the unit A and the second unit C is disposed at a forth bonding site (a site different from the first, second, and third bonding sites) of the unit A. According to this, the deformation can be favorably achieved at a lower voltage. As a result, the flexibility of the deformable material can be further enhanced. Further, a change in the color tone due to the oxidation-reduction reaction becomes more evident, and therefore, it becomes possible to more easily and reliably recognize the degree of deformation or the like of the deformable material in appearance.

As described above, in the case where the stimulus-responsive compound has a unit A which can be axially rotated, units B (a first unit B and a second unit B) which are two units bonded to both ends (a first bonding site and a second bonding site) of the unit A and can form a bond between the units according to an oxidation-reduction reaction, and units C (a first unit C and a second unit C) which are two units bonded to the units B (the first unit B and the second unit B) and have liquid crystallinity, deformation (displacement) can be achieved at a lower electric power, and also the degree of displacement can be relatively increased. The reason for this is considered to be as follows.

That is, due to the units C having liquid crystallinity, the plurality of stimulus-responsive compound molecules can exist in an oriented (aligned) state, and when a voltage or the like is applied in such an oriented state, the units B in one molecule are bonded (cross-linked) to each other according to an oxidation-reduction reaction. In this manner, by utilizing the orientation (liquid crystallinity) of the units C and the bondability of the units B by stimulation, the stimulus-responsive compound can be reliably deformed (displaced) from the state shown in FIG. 3(a) to the state shown in FIG. 3(b). In particular, since the orientation of the units C and the bonding of the units B proceed at a low voltage, it is possible to achieve large deformation (displacement) at a low voltage.

Incidentally, in the case where the stimulus-responsive compound obtained by polymerization utilizing the polymerizable functional group of the unit C is used, as described above, further larger deformation can be achieved at a low voltage.

Figure 4A:
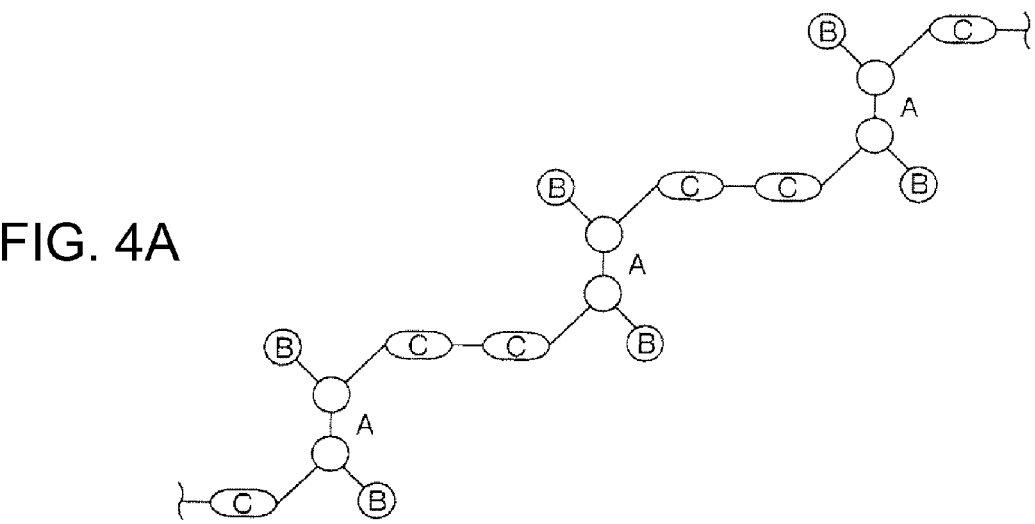
FIG. 4 shows views for illustrating the molecular structures of a stimulus-responsive compound constituting the actuator of the invention before and after an oxidation-reduction reaction.
Figure 4B:
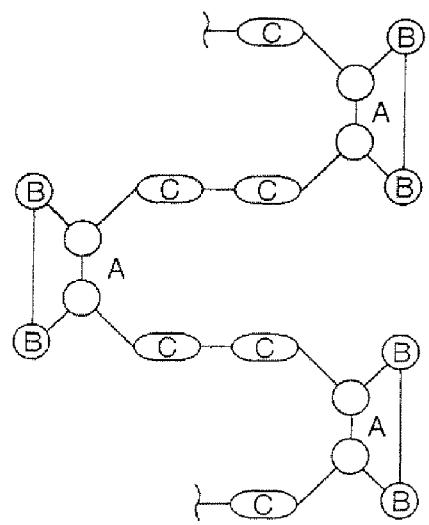

That is, the stimulus-responsive compound which is a polymer obtained by polymerizing the constituent unit utilizing the polymerizable functional group of the unit C is in a state where the constituent units are connected in series as the structure shown in FIG. 4. In the case where the stimulus-responsive compound is in an oxidized state, as shown in FIG. 4(a), the constituent units exist in an extended state where the constituent units are connected to one another in a longitudinal direction. According to this, the molecular conformation is in an extended (expanded) state. In the case where the stimulus-responsive compound is in a reduced state, as shown in FIG. 4(b), the constituent unit rotates by using the unit A as an axis and is transformed into a state where the adjacent units B are bonded to each other according to an oxidation-reduction reaction, and further the units C having liquid crystallinity are oriented to form a folded structure by using the units B as base points. In this manner, the molecular conformation is transformed into a contracted state. As described above, the molecular conformation of the stimulus-responsive compound as a whole is largely changed. The stimulus-responsive material obtained by polymerizing the constituent unit having the units B has the plurality of units B to be used as the base points of folding. Therefore, the degree of displacement of the stimulus-responsive material as a whole can be increased.

Further, by applying a voltage to the stimulus-responsive compound, the units C including a functional group having liquid crystallinity are oriented in a predetermined direction. Therefore, due to the synergistic effect of the existence of the plurality of units B to be used as the base points of folding as described above and the orientation of the units C of the respective constituent units, the degree of displacement of the stimulus-responsive material as a whole can be further increased.

The stimulus-responsive compound may further contain a unit D having a polyalkylene oxide structure obtained by polymerizing an alkylene oxide having 2 and/or 3 carbon atoms in the molecule in addition to the unit A, the units B (the first unit B and the second unit B), and the units C (the first unit C and the second unit C) described above (see FIGS. 5 and 6). According to this, the deformation can be favorably achieved at a lower voltage. Further, the flexibility of the first deformable material layer 11 (actuator 100) can be further enhanced. Further, crystallization of the stimulus-responsive compound (deformable material) can be reliably prevented even at a low temperature, and therefore, the operability in a low temperature range (for example −10° C. or lower) can be particularly enhanced. In addition, by the incorporation of the unit D in the stimulus-responsive compound, the affinity and compatibility of the stimulus-responsive compound as a whole with a salt (an electrolyte) can be enhanced, and therefore, charge transfer during an oxidation-reduction reaction is achieved more rapidly. As a result, the response speed of the actuator 100 including the stimulus-responsive compound is further increased.

Further, by the incorporation of the unit D in the stimulus-responsive compound, the ability to retain a solvent (liquid retention capability) of the stimulus-responsive compound as a whole can be particularly enhanced. Therefore, the first deformable material layer 11 can be adjusted to have a most suitable hardness. Further, the actuator 100 can be made to deform more flexibly, and thus to operate more smoothly.

In the stimulus-responsive compound, one unit D may be contained in the molecule, however, in the structure shown in FIG. 5, as the unit D, a first unit D and a second unit D are contained. According to this, the deformation can be favorably achieved at a lower voltage. Further, the flexibility of the actuator 100 and the operability thereof in a low temperature range can be further enhanced.

The unit D may be bonded to any site in the molecule of the stimulus-responsive compound, and for example, may be bonded to the unit B, but is preferably bonded to the unit A. In particular, in the case where two units D (a first unit D and a second unit D) are contained in the molecule, it is preferred that the first unit D is disposed at a third bonding site (a site different from the first and second bonding sites) of the unit A and the second unit D is disposed at a forth bonding site (a site different from the first, second, and third bonding sites) of the unit A. According to this, the deformation can be favorably achieved at a lower voltage. Further, the flexibility of the actuator 100 and the operability thereof in a low temperature range can be further enhanced.

It is preferred that the first unit D is bonded to the first unit C, and the second unit D is bonded to the second unit C. According to this, the deformation can be favorably achieved at a lower voltage. Further, the flexibility of the actuator 100 and the operability thereof in a low temperature range can be further enhanced.

Further, by bonding the unit D to both of the unit A and the unit C, that is, by interposing the unit D between the unit A and the unit C, the transition to the oriented state of the units C having liquid crystallinity proceeds more rapidly, so that the actuator 100 can be deformed (displaced) more rapidly and smoothly, and thus can be driven at a lower voltage.

As described above, the units D (the first unit D and the second unit D) each have a polyalkylene oxide structure obtained by polymerizing an alkylene oxide having 2 and/or 3 carbon atoms.

In the case where the unit D has a structure in which an alkylene oxide having 2 carbon atoms (ethylene oxide) is polymerized, the flexibility of the actuator 100 and the operability thereof in a low temperature range and so on can be particularly enhanced. Further, the response speed of the actuator 100 can be particularly increased.

Meanwhile, in the case where the unit D has a structure in which an alkylene oxide having 3 carbon atoms (propylene oxide) is polymerized, the durability of the deformable material and the actuator 100 can be particularly enhanced.

The number of the polymerized alkylene oxide molecules (the number of molecules of the alkylene oxide to be used as a starting material) in the units D (the first unit D and the second unit D) is preferably 4 or more and 20 or less, more preferably 5 or more and 10 or less. As a result, the durability of the deformable material and the actuator 100 can be further enhanced, and also the flexibility of the actuator 100 and the operability thereof in a low temperature range and so on can be particularly enhanced, and therefore, the response speed of the actuator 100 can be particularly increased.

As described above, in the invention, the stimulus-responsive compound changes its molecular conformation according to an oxidation-reduction reaction. This compound is easily deformed (displaced) by applying a voltage, and thus, the whole deformable material can be largely displaced. As a result, in the actuator 100, a sufficiently large displacement amount can be obtained at a low voltage. Further, the response speed of the deformable material can be increased, and also the reproducibility of the deformation is excellent. Further, it is possible to reduce the weight of the actuator 100.

Further, the change in the conformation of the stimulus-responsive compound according to an oxidation-reduction reaction is reversible, and displacement from a contracted state to an extended (expanded) state and displacement from an extended (expanded) state to a contracted state can be repeated, and therefore, the stimulus-responsive compound has also excellent reproducibility.

As described above, the stimulus-responsive compound changes its molecular conformation and has the reversibility and reproducibility thereof. Therefore, the deformable material containing the stimulus-responsive compound also has the same effects. As a result, in the whole deformable material, the degree of deformation (deformation ratio) can be increased, and also a directionality can be imparted to the deformation. In addition, by stopping the application of a voltage, the shape of the deformable material can be maintained.

Further, the stimulus-responsive compound also changes its color tone according to an oxidation-reduction reaction. This is considered to be mainly due to a change in the electron state (particularly, π-electron conjugated system) of the stimulus-responsive compound according to an oxidation-reduction reaction. In this manner, since the stimulus-responsive compound also changes its color tone according to an oxidation-reduction reaction, it is possible to determine the oxidized or reduced state of the stimulus-responsive compound according to the color tone of the stimulus-responsive compound (deformable material).

In particular, since the stimulus-responsive compound changes its molecular conformation and also changes its color tone according to an oxidation-reduction reaction, the deformation amount of the deformable material can be known according to the color tone of the deformable material containing the stimulus-responsive compound, and moreover, even in the case where the deformable material is not deformed actually, an energy accumulated for deformation in the deformable material can be recognized in appearance.

More specifically, the following examples are exemplified. That is, for example, in spite that the stimulus-responsive compound is microscopically deformed according to an oxidation-reduction reaction, in a state where a relatively large load is applied to the deformable material, the deformable material as a whole cannot be deformed macroscopically, or the deformation amount is relatively small as compared with the degree of progress of the oxidation-reduction reaction in some cases. Even in such a case, when the load is released or reduced, the deformable material can be deformed according to the degree of progress of the oxidation-reduction reaction of the stimulus-responsive compound. In other words, in the case where the deformable material is not deformed actually, the deformable material can be sometimes in a state in which an energy for deformation is accumulated therein (in a high energy state). In the case of a deformable material in the related art, it was difficult to determine in appearance (including by measurement or the like using an optical device such as a microscope) whether or not the deformable material is in a state in which an energy for causing such deformation is accumulated therein, however, according to the invention, it can be easily determined in appearance whether or not the deformable material is in a state in which an energy for causing deformation is accumulated therein, and also how much energy for causing deformation is accumulated therein.

Specific examples of the stimulus-responsive compound include compounds represented by the following formulae (17) and (19) to (21).

[Chem. 6]

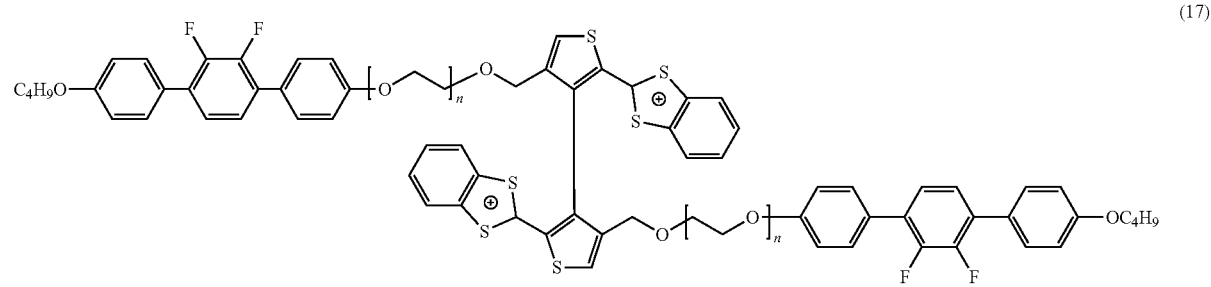

(17)

[Chem. 7]

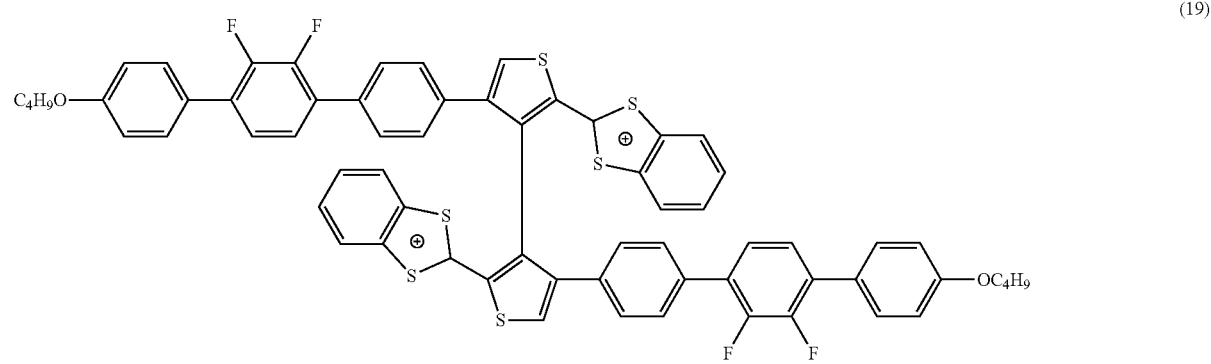

(19)

[Chem. 8]

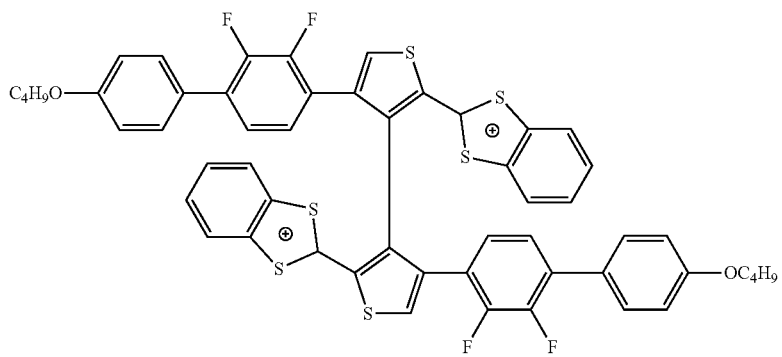

(20)

[Chem. 9]

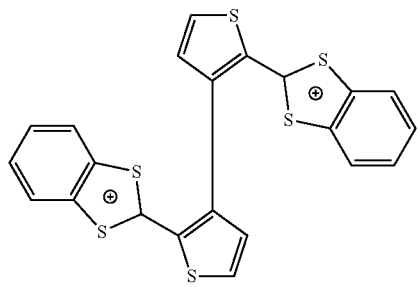

(21)

The stimulus-responsive compound represented by the formula (17) shows an absorption spectrum with an absorption peak at 443 nm in an oxidized state. The stimulus-responsive compound represented by the formula (19) shows an absorption spectrum with an absorption peak at 457 nm in an oxidized state. The stimulus-responsive compound represented by the formula (20) shows an absorption spectrum with an absorption peak at 447 nm in an oxidized state. The stimulus-responsive compound represented by the formula (21) shows an absorption spectrum with an absorption peak at 420 nm in an oxidized state.

The content of the stimulus-responsive compound in the deformable material is preferably 10% by mass or more and 80% by mass or less, more preferably 20% by mass or more and 60% by mass or less. According to this, the effect of the invention of the incorporation of a polymeric material and an electronically conductive substance as described in detail below along with the stimulus-responsive compound as described above is more prominently exhibited.

<Electronically Conductive Substance>

The deformable material constituting the first deformable material layer 11 contains, in addition to the stimulus-responsive compound as described above, an electronically conductive substance which has a function of transporting electrons in the deformable material and also has a light transmitting property.

The "light transmitting property" as used herein refers to a property of transmitting at least part of an incident light (visible light). More specifically, in the case where a target substance is formed into a film having a thickness of 0.1 mm, the visible light transmittance of the film is preferably 20% or more, more preferably 30% or more, further preferably 40% or more. When the electronically conductive substance satisfies such a condition, even in the case where the content of the electronically conductive substance is relatively high, the deformable material as a whole can have a high transmittance, and in the deformable material, it becomes possible to favorably recognize a change in the color tone due to the oxidation-reduction reaction of the stimulus-responsive compound as described above. Incidentally, in the measurement of the visible light transmittance, for example, a light source with a wavelength of 633 nm can be used.

Examples of the electronically conductive substance include metal oxides such as $In_2O_3$, $ZnO$, $CdO$, $Ga_2O_3$, and $SnO_2$, substances obtained by doping the above-described metal oxides with tin (Sn), antimony (Sb), fluorine (F), aluminum (Al), gallium (Ga), or the like (for example, ITO (Sn-doped $In_2O_3$), AZO (Al-doped ZnO), GZO (Ga-doped ZnO), etc.), substances containing two or more substances selected from the above-described substances (for example, IZO ($In_2O_3$—ZnO), IGZO ($In_2O_3$—$Ga_2O_3$—ZnO), etc.) (hereinafter, these are collectively referred to as "metal oxides"), CuIn, a variety of metal nanoparticles, a variety of metal nanowires, semiconductor materials such as Si-based and Ga-based semiconductor materials, and electrically conductive polymers such as polyaniline, polythiol, polypyrrole, and PEDOT:PSS (3,4-polyethylenedioxythiophene-polystyrenesulfonate), and one type or two or more types in combination selected from these substances can be used. In particular, the electronically conductive substance preferably contains one type or two or more types selected from the group consisting of ITO, IZO, GZO, ZnO, CdO, AZO, and IGZO. According to this, high electronic conductivity can be imparted to the whole deformable material. Further, these materials can particularly stably maintain excellent transparency over a long period of time even in a variety of electronically conductive substances. Due to this, it is possible to determine more favorably a change in the color tone (discoloration) of the stimulus-responsive compound described above over a longer period of time.

The electronically conductive substance may be dissolved in the other component in the deformable material, but preferably exists as an insoluble component in the deformable material, and particularly preferably exists therein in the form of a solid.

Examples of the form of the electronically conductive substance include various forms such as a particle, a plate, and a fiber (for example, a tube), but the electronically conductive substance is particularly preferably in the form of a particle. The shape of the particle may be either a sphere or a non-sphere (for example, a scale, a spindle, or a spheroid). According to this, the electronically conductive substance can be dispersed uniformly in the whole first deformable material layer 11, and the whole deformable material can be largely displaced uniformly at a relatively low voltage, and thus, the whole actuator 100 can be largely displaced uniformly.

In the case where the electronically conductive substance is in the form of a particle, the average particle diameter thereof is preferably 5 nm or more and 10 μm or less, more preferably 10 nm or more and 1 μm or less. According to this, by providing a necessary concentration of the electronically conductive material in the whole first deformable material layer 11, supply of electrons can be reliably achieved in the first deformable material layer 11. Further, the efficiency of supplying electrons to the stimulus-responsive compound can be particularly enhanced, and the actuator 100 can be deformed (displaced) more rapidly and smoothly. On the other hand, if the average particle diameter thereof is less than the above-described lower limit, the electronically conductive material is aggregated, and therefore, a treatment for preventing this aggregation is needed. Meanwhile, if the average particle diameter thereof exceeds the above-described upper limit, it is necessary to increase the content of the electronically conductive material, and a further improvement of the effect as described above is not observed.

The "average particle diameter" as used herein refers to an average particle diameter on the volume basis (volume average particle diameter ($D_{50}$)). Examples of the measurement device include a laser diffraction scattering particle size analyzer, Microtrack MT-3000 (manufactured by Nikkiso Co., Ltd.). The volume average particle diameters ($D_{50}$) in the below-described Examples are values measured by the above-described Microtrack MT-3000.

The electronically conductive material may be in any form such as a dense, porous, or hollow form.

By the incorporation of the electronically conductive material as described above, the whole first deformable material layer 11 can be largely displaced at a relatively low voltage. In particular, even in the case where the thickness of the first deformable material layer 11 is relatively large, the whole first deformable material layer 11 can be efficiently deformed. As a result, a larger displacement force and displacement amount can be obtained at a low voltage. Further, the deformable material (first deformable material layer 11) can be more largely displaced even if a wiring extracted from the power source 10 is not brought into contact with a large area of the deformable material (first deformable material layer 11). As a result, the actuator 100 deforms more flexibly and thus can operate smoothly. Further, even if the thickness of the deformable material is relatively large, a difference in the deformation amount between the vicinity of the surface thereof and the vicinity of the central portion thereof is decreased, and therefore, the control of the deformation amount is facilitated. In addition, since the electronically conductive material has a light transmitting property, in the first deformable material layer 11, it becomes possible to favorably recognize a change in the color tone due to the oxidation-reduction reaction of the stimulus-responsive compound as described above.

The content of the electronically conductive substance in the deformable material is preferably 10% by mass or more and 90% by mass or less, more preferably 30% by mass or more and 70% by mass or less. According to this, electrons in the deformable material can be favorably transported, and the actuator 100 can be deformed (displaced) more rapidly and smoothly. Further, even if the light transmitting property of the electronically conductive substance is relatively low, it becomes possible to favorably recognize a change in the color tone due to the oxidation-reduction reaction of the stimulus-responsive compound as described above in the deformable material. On the other hand, if the content of the electronically conductive substance is less than the above-described lower limit, the function of assisting the electron transfer in the deformable material is decreased. Meanwhile, if the content of the electronically conductive substance exceeds the above-described upper limit, a further improvement of the effect as described above is not observed.

The dispersion state of the electronically conductive substance in the deformable material is preferably uniform, however, the deformable material may have a portion in which the concentration of the electronically conductive material in the deformable material continuously or discontinuously (intermittently) changes. In the case where the dispersion state of the electronically conductive substance in the deformable material is uniform, the whole deformable material can be more largely displaced uniformly at a relatively low voltage. In particular, even if the thickness of the deformable material is relatively large, the whole deformable material can be efficiently deformed.

<Polymeric Material>

The deformable material constituting the first deformable material layer 11 contains a polymeric material in addition to the stimulus-responsive compound and the electronically conductive substance as described above. According to this, as the stimulus-responsive compound is deformed according to an oxidation-reduction reaction, the polymeric material is also displaced, and as a result, the degree of deformation according to an oxidation-reduction reaction is amplified, and thus, the degree of deformation of the first deformable material layer 11 as a whole can be increased. As a result, the degree of deformation of the actuator 100 as a whole can be increased.

The visible light transmittance of the polymeric material (in the case where the polymeric material is formed into a film having a thickness of 0.1 mm, the visible light transmittance of the film) is preferably 5% or more, more preferably 10% or more, further more preferably 20% or more.

As the polymeric material constituting the deformable material, any of a variety of resin materials can be used, however, the deformable material constituting the first deformable material layer 11 preferably contains, as the polymeric material, one member or two or more members selected from the group consisting of a vinylidene fluoride-propylene hexafluoride copolymer, poly(methyl(meth)acrylate), and an organic electrolyte oligomer. According to this, the whole deformable material can be adjusted to have a most suitable hardness. Further, the deformable material (actuator 100) can be made to deform more flexibly, and thus to operate more smoothly. Further, in the case of the deformable material in the form of a gel, the ability to retain a solvent (a liquid component) can be particularly enhanced, and therefore, an undesirable decrease in the volume of the deformable material (actuator 100) over time can be more effectively prevented. Further, a vinylidene fluoride-propylene hexafluoride copolymer, poly(methyl(meth)acrylate), and an organic electrolyte oligomer are each a material having particularly high transparency, and therefore, a change in the color tone (discoloration) of the stimulus-responsive compound described above can be more favorably determined.

In particular, in the case where the deformable material constituting the first deformable material layer 11 contains a vinylidene fluoride-propylene hexafluoride copolymer as the polymeric material, the deformable material can be made more flexible. Further, it is possible to make the deformable material less susceptible to the effect of the variation in water concentration. As a result, undesirable absorption of water or the like of the deformable material can be more effectively prevented, and thus, the deformation amount of the actuator 100 can be more reliably adjusted.

The weight average molecular weight (Mw) of the vinylidene fluoride-propylene hexafluoride copolymer is preferably 10,000 or more and 1,000,000 or less, more preferably 100,000 or more and 500,000 or less. According to this, the effect as described above is more prominently exhibited.

Incidentally, the chemical structure of the vinylidene fluoride-propylene hexafluoride copolymer can be represented by the following formula (9).

[Chem. 10]

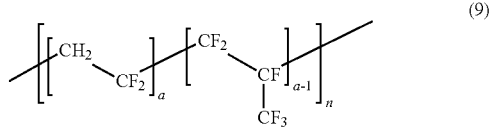

(9)

In the formula (9), a may be any as long as it satisfies the following condition: 0<a<1, but is preferably 0.60 or more and 0.98 or less, more preferably 0.75 or more and 0.95 or less. According to this, the deformable material can have flexibility more suitable for deformation.

Further, in the case where the deformable material constituting the first deformable material layer 11 contains poly(methyl(meth)acrylate) as the polymeric material, cracking or the like can be more reliably prevented from occurring when the deformable material is deformed.

The weight average molecular weight (Mw) of poly (methyl(meth)acrylate) is preferably 10,000 or more and 100,000 or less, more preferably 10,000 or more and 50,000 or less. According to this, the effect as described above is more prominently exhibited.

Incidentally, the chemical structure of poly(methyl(meth) acrylate) can be represented by the following formula (10).

[Chem. 11]

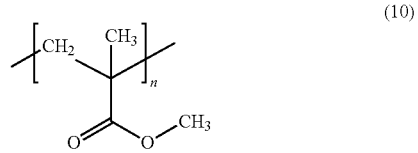

(10)

In the case where the deformable material constituting the first deformable material layer 11 contains an organic electrolyte oligomer as the polymeric material, the organic electrolyte oligomer can also function as an electrolyte described below.

Incidentally, as the organic electrolyte oligomer, for example, one represented by the following formula (11) can be used.

[Chem. 12]

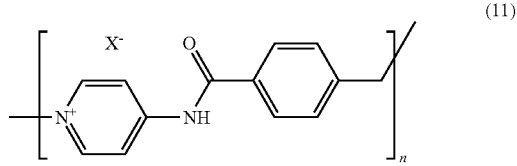

(11)

(In the formula (11), X represents a halogen, $(CF_3SO_2)N$, $PF_6$, $BF_4$, SCN, or $CF_3SO_3$, and n represents a number of 3 or more and 30 or less.)

In the case where the deformable material contains one member or two or more members selected from the group consisting of a vinylidene fluoride-propylene hexafluoride copolymer, poly(methyl(meth)acrylate), and an organic electrolyte oligomer, the sum of the contents of these compounds in the deformable material is preferably 5% by mass or more and 50% by mass or less. According to this, the effect as described above can be more prominently exhibited while allowing the stimulus-responsive compound and the electronically conductive substance to sufficiently exhibit their functions.

The deformable material constituting the first deformable material layer 11 may contain a liquid crystal polymer as the polymeric material. According to this, the response speed of the stimulus-responsive compound (deformable material) can be effectively increased. Further, the displacement of the whole deformable material accompanying the expansion and contraction of the stimulus-responsive compound can be more favorably amplified, and thus the displacement amount of the actuator 100 as a whole can be particularly increased. Further, the liquid crystal polymer is generally a material having particularly high transparency, and therefore, a change in the color tone (discoloration) of the stimulus-responsive compound described above can be more favorably determined.

Particularly, the liquid crystal polymer preferably has an assisting function so as to be beneficial to the molecular deformation due to the conformation of the stimulus-responsive compound as described above. In particular, in the case where the deformable material constituting the first deformable material layer 11 contains a compound including a functional group having liquid crystallinity as the stimulus-responsive compound, by the incorporation of the liquid crystal polymer as the polymeric material, as the orientation of the functional group (unit C) having liquid crystallinity is changed according to the oxidation-reduction reaction of the stimulus-responsive compound, the orientation of the liquid crystal polymer is also changed so as to be beneficial to the molecular deformation due to the conformation of the stimulus-responsive compound as described above. Accordingly, the degree of deformation of the deformable material (actuator 100) as a whole can be further increased, and also the response speed can be made faster. That is, the deformable material (actuator 100) has particularly excellent high-speed responsiveness and exhibits a larger degree of anisotropic expansion and contraction.

The liquid crystal polymer can be obtained by polymerizing a monomer including a functional group having liquid crystallinity.

As the functional group having liquid crystallinity, a group having a plurality of ring structures, for example, a group in which a plurality of aromatic rings (for example, phenyl groups) are linked to one another through an ester group and a group in which aromatic rings (for example, benzene rings) or cyclohexane rings are directly linked to one another can be exemplified.

Examples of the monomer can include a monomer including a functional group having liquid crystallinity and an acrylic group and a monomer including a functional group having liquid crystallinity and a (meth)acrylic group.

Examples of such a monomer can include compounds represented by the following formula (6) or (7).

[Chem. 13]

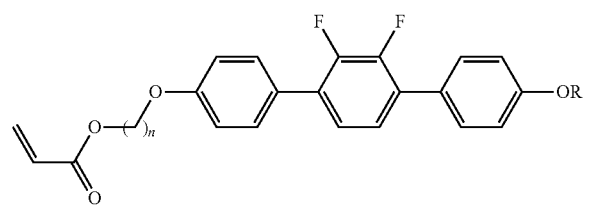

(6)

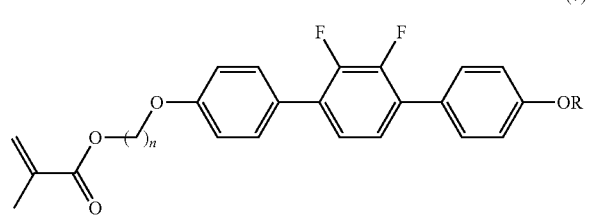

(7)

(In the formulae (6) and (7), n represents an integer of 6 or more, and R represents an alkyl group having 1 or more carbon atoms.)

By using such a monomer, the deformable material can be deformed (displaced) more rapidly and smoothly, and can be driven at a lower voltage. Further, the transparency of the liquid crystal polymer can be particularly increased, and therefore, a change in the color tone (discoloration) of the stimulus-responsive compound described above can be more favorably determined.

In the case where the deformable material contains a liquid crystal polymer as the polymeric material, the liquid crystal polymer is preferably obtained by cross-linking with a cross-linking agent. According to this, the deformable material can be favorably solidified (gelled). That is, by the incorporation of the liquid crystal polymer having a cross-linked structure, the stimulus-responsive compound can be incorporated in the molecule of the liquid crystal polymer, and the deformable material can be solidified (gelled). As a result, the shape stability and the handleability of the deformable material as a whole are particularly enhanced. Further, according to this, the anisotropic expansion and contraction of the deformable material (actuator 100) can be more favorably achieved. In addition, because of having a cross-linked structure, the deformable material has more favorable elasticity.

The cross-linking agent is not particularly limited and any cross-linking agent may be used as long as it can cross-link a polymer formed from the above-described monomer. However, by using a cross-linking agent represented by the following formula (8), the stimulus-responsive compound can be more easily incorporated in the molecule of the liquid crystal polymer, and the deformable material can be more reliably solidified (gelled).

[Chem. 14]

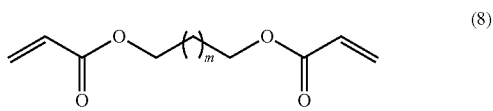

(8)

(In the formula (8), m represents an integer of 4 or more.)

Specific examples of the cross-linking agent can include bisacryloyloxyhexane, N,N-methylenebisacrylamide, and ethylene glycol dimethacrylate.

The liquid crystal polymer is preferably obtained by adding the cross-linking agent in an amount of 1 mol or more and 10 mol or less with respect to 100 mol of the monomer including a functional group having liquid crystallinity to effect cross-linking. According to this, the displacement of the whole deformable material (actuator 100) accompanying the expansion and contraction of the stimulus-responsive compound can be efficiently amplified.

Further, in the case where the deformable material contains a compound including a functional group having liquid crystallinity as the stimulus-responsive compound, the liquid crystal polymer preferably has the same functional group as the functional group having liquid crystallinity of the stimulus-responsive compound in its molecule. According to this, the response speed of the stimulus-responsive compound (deformable material) can be more effectively increased. Further, the displacement of the whole actuator 100 accompanying the expansion and contraction of the stimulus-responsive compound can be more favorably amplified, and thus the displacement amount of the actuator 100 as a whole can be further increased. In addition, the actuator 100 can be deformed at a lower voltage. Further, the affinity (compatibility) between the stimulus-responsive compound and the liquid crystal polymer can be particularly enhanced, and therefore, the transparency of the deformable material can be particularly increased. As a result, a change in the color tone (discoloration) of the stimulus-responsive compound described above can be more favorably determined.

The weight average molecular weight (Mw) of the liquid crystal polymer is preferably 10,000 or more and 100,000 or less, more preferably 10,000 or more and 50,000 or less. According to this, the effect as described above is more prominently exhibited.

By using the liquid crystal polymer as described above, the response speed of the deformable material can be effectively increased. Further, the displacement of the whole deformable material accompanying the expansion and contraction of the stimulus-responsive compound can be more favorably amplified, and thus the displacement amount of the deformable material as a whole can be particularly increased.

The content of the liquid crystal polymer in the deformable material is preferably 3% by mass or more and 40% by mass or less. According to this, the effect as described above is more prominently exhibited while allowing the stimulus-responsive compound and the electronically conductive substance to sufficiently exhibit their functions as described above.

Further, in the case where the deformable material constituting the first deformable material layer 11 contains the liquid crystal polymer along with one member or two or more members selected from the group consisting of a vinylidene fluoride-propylene hexafluoride copolymer, poly(methyl(meth)acrylate), and an organic electrolyte oligomer as the polymeric material, the effect as described above can be obtained, and also these components synergistically interact with one another so that the strength of the deformable material can be further increased, and also the displacement amount can be further increased.

The content of the polymeric material in the deformable material is preferably 5% by mass or more and 80% by mass or less. According to this, the effect as described above is more prominently exhibited.

<Electrolyte>

The deformable material constituting the first deformable material layer 11 contains an electrolyte.

As the electrolyte, any of a variety of acids, bases, and salts can be used, however, it is preferred to use a salt. According to this, the durability of the deformable material can be particularly enhanced. As the electrolyte salt, for example, an inorganic salt such as lithium perchlorate, lithium trifluoromethanesulfonate, or lithium hexafluorophosphate; an organic salt such as tetra-n-butylammonium hexafluorophosphate (TBAPF$_6$), tetrabutylammonium tetrafluoroborate (TBABF$_4$), tetrabutylammonium perchlorate (TBAP), 1-butyl-1-methylpyrrolidinium bis(trifluoromethylsulfonyl)imide (BMPTFSI), methyltrioctylammonium bis(trifluoromethylsulfonyl)imide (MTOATFSI), triethylsulfonium bis(trifluoromethylsulfonyl)imide (TESTFSI), or 1-ethyl-3-methylimidazolium trifluoromethanesulfonate (EMICF$_3$SO$_3$); or the like can be used. The structural formulae of BMPTFSI, MTOATFSI, TESTFSI, and EMICF$_3$SO$_3$ are represented by the following formula (12), the following formula (13), the following formula (14), and the following formula (15), respectively.

[Chem. 15]

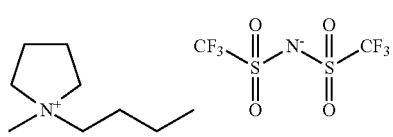

(12)

[Chem. 16]

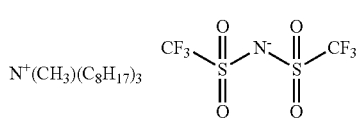

(13)

[Chem. 17]

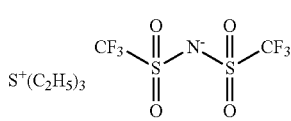

(14)

[Chem. 18]

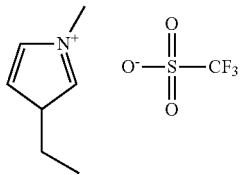

(15)

It is preferred that the deformable material contains one member or two or more members selected from the group consisting of lithium perchlorate, lithium trifluoromethanesulfonate, lithium hexafluorophosphate, tetra-n-butylammonium hexafluorophosphate (TBAPF$_6$), tetrabutylammonium tetrafluoroborate (TBABF$_4$), and tetrabutylammonium perchlorate (TBAP) as the electrolyte among these compounds. According to this, the response speed of the stimulus-responsive compound (the deformable material and the actuator 100) can be more effectively increased, and also the displacement of the whole actuator 100 accompanying the expansion and contraction of the stimulus-responsive compound can be further amplified.

Due to the incorporation of the electrolyte as described above, an electric current can flow stably by the power source 10, and also the electric charge transfer to and from the stimulus-responsive compound can be allowed to more rapidly proceed, and therefore, the high-speed responsiveness of the first deformable material layer 11 can be particularly enhanced. In addition, the stimulus-responsive compound constituting the first deformable material layer 11 can be efficiently expanded and contracted throughout the whole first deformable material layer 11 (in particular, the whole first deformable material layer 11 in the thickness direction). As a result, the ratio of expansion and contraction of the actuator 100 as a whole can be particularly increased. Further, since the electrolyte is generally a material having a high light transmitting property (transparency), and therefore, in the deformable material, an adverse effect on the recognition of a change in the color tone due to the oxidation-reduction reaction of the stimulus-responsive compound as described above can be reliably prevented.

The visible light transmittance of the electrolyte (the visible light transmittance of the electrolyte in a solvent having a thickness of 0.1 mm) is preferably 80% or more, more preferably 90% or more, further more preferably 95% or more.

The content of the electrolyte in the deformable material is preferably 3% by mass or more and 80% by mass or less, more preferably 5% by mass or more and 30% by mass or less. According to this, the effect as described above is more prominently exhibited.

<Solvent>

The deformable material constituting the first deformable material layer 11 may contain a solvent. When the solvent is incorporated in the molecule of the above-described polymeric material, the deformable material is favorably gelled, and therefore, solidification can be easily achieved and also the handleability of the deformable material can be improved. Further, the first deformable material layer 11 can be adjusted to have a most suitable hardness, and therefore, the flexibility of the actuator 100 can be particularly enhanced. Further, in the case where the electrolyte which is in the form of a solid when it is present alone is contained, the solvent can dissolve the electrolyte in the deformable material and can favorably bring the electrolyte to an ionized state. Further, the solvent is generally a material having a high light transmitting property (transparency), and therefore, in the deformable material, an adverse effect on the recognition of a change in the color tone due to the oxidation-reduction reaction of the stimulus-responsive compound as described above can be reliably prevented.

The visible light transmittance of the solvent (the visible light transmittance of the solvent having a thickness of 0.1 mm) is preferably 80% or more, more preferably 90% or more, further more preferably 95% or more.

Examples of the solvent can include organic solvents such as dimethyl sulfoxide (DMSO), toluene, benzene, dimethylformamide (DMF), dimethylacetamide (DMA), chloroform, dichloromethane, dichloroethane, acetone, propylene carbonate, methylpentanone, ethylpentanone, and acetonitrile.

The content of the solvent in the deformable material is preferably 20% by mass or more and 80% by mass or less, more preferably 30% by mass or more and 60% by mass or less. According to this, the handleability of the deformable material can be further enhanced.

The deformable material constituting the first deformable material layer 11 may contain a component other than the above-described components (other component).

The deformable material according to the invention may contain a component other than the above-described components (other component).

The electrical conductivity of the first deformable material layer 11 is preferably 0.1 S/cm or more, more preferably 1 S/cm or more. According to this, the response speed of the actuator 100 can be particularly increased, and also the size of the actuator 100 can be reduced.

The thickness of the first deformable material layer 11 is not particularly limited, but is preferably 5 mm or less. According to this, a larger displacement force can be obtained while decreasing the driving voltage to a relatively low level.

Further, in the case where the first deformable material layer 11 contains an electronically conductive substance, the thickness of the first deformable material layer 11 is preferably 0.01 mm or more and 10 mm or less, more preferably 0.03 mm or more and 1 mm or less. According to this, even if the thickness of the first deformable material layer 11 is relatively large, the actuator can be more favorably driven.

<Second Deformable Material Layer>

Next, the second deformable material layer will be described.

In the same manner as the first deformable material layer 11 described above, the second deformable material layer 12 is constituted by a material containing a stimulus-responsive compound, a polymeric material, an electronically conductive substance, and an electrolyte, and may further contain a solvent or the like.

As the constituent material of the second deformable material layer 12, the material described for the first deformable material layer 11 can be used. The second deformable material layer 12 may be constituted by the same material or the same type of material as that of the first deformable material layer 11 or may be constituted by a different material from that of the first deformable material layer 11. For example, as the stimulus-responsive compound (second stimulus-responsive compound) constituting the second deformable material layer 12, a compound having a different light absorption spectrum (a compound having a different absorption peak wavelength) from that of the stimulus-responsive compound (first stimulus-responsive compound) constituting the first deformable material layer 11 may be used. According to this, it can be favorably determined which of the first deformable material layer 11 and the second deformable material layer 12 is deformed (expanded), or accumulates an energy for deformation (expansion) therein, or the like.

Also with respect to the conditions such as electrical conductivity, thickness, etc., the second deformable material layer 12 preferably satisfies the same conditions as those described for the above first deformable material layer 11. According to this, the same effects as those described for the first deformable material layer 11 are obtained. Incidentally, in the actuator 100, the conditions for the second deformable material layer 12 may be the same as or different from those for the first deformable material layer 11.

<Intermediate Layer>

Next, the intermediate layer will be described.

The intermediate layer 13 is disposed between the first deformable material layer 11 and the second deformable material layer 12 and functions as a separator. The intermediate layer 13 has a function of allowing ions (obtained by ionization of the electrolyte) of the electrolyte contained in the first deformable material layer 11 and the second deformable material layer 12 to pass therethrough. Further, the intermediate layer 13 has a function of preventing electron transfer and inhibits electron transfer between the first deformable material layer 11 and the second deformable material layer 12 through the intermediate layer 13. Therefore, the electron transfer to and from the first deformable material layer 11 and the second deformable material layer 12 can be achieved through an external electrode or wiring, and therefore, the actuator can be deformed, or the deformation direction can be controlled.

The intermediate layer 13 preferably has flexibility so as to be deformed following the first deformable material layer 11 and the second deformable material layer 12. According to this, the whole actuator 100 can be made to deform flexibly, and thus to operate smoothly.

Further, the intermediate layer 13 may be in any form such as a solid or a liquid, but is preferably in the form of a gel. According to this, the whole actuator 100 deforms more flexibly and thus can operate smoothly.

Further, the intermediate layer 13 preferably contains one member or two or more members selected from the group consisting of a vinylidene fluoride-propylene hexafluoride copolymer, poly(methyl(meth)acrylate), and an organic electrolyte oligomer. According to this, the ability to retain a solvent (a liquid component) contained in the intermediate layer 13 in the form of a gel can be enhanced. As a result, the stability of the intermediate layer 13 over time can be improved. Further, an undesirable decrease in the volume of the actuator 100 over time can be more effectively prevented.

In the case where the intermediate layer 13 contains one member or two or more members selected from the group consisting of a vinylidene fluoride-propylene hexafluoride copolymer, poly(methyl(meth)acrylate), and an organic electrolyte oligomer, the sum of the contents of these compounds in the intermediate layer 13 is preferably 5% by mass or more and 50% by mass or less. According to this, the intermediate layer 13 can have moderate flexibility, and thus, the reliability and durability of the actuator 100 are enhanced.

Further, the intermediate layer 13 preferably contains an electrolyte. According to this, the transfer of electrons is smoothly achieved, and as a result, the transfer of ions of the electrolyte can be more smoothly achieved between the first deformable material layer 11 and the second deformable material layer 12 through the intermediate layer 13. Further, the high-speed responsiveness of the actuator 100 can be particularly enhanced.

As the electrolyte, the electrolyte exemplified as the constituent component of the first deformable material layer described above can be used. According to this, the durability of the deformable material can be particularly enhanced.

Further, the electrolyte as the constituent component of the first deformable material layer 11 and the second deformable material layer 12 may be different from the electrolyte as the constituent component of the intermediate layer 13, however, it is preferred that they contain the same component or the same type of component. According to this, particularly excellent adhesiveness of the intermediate layer 13 to the first deformable material layer 11 and the second deformable material layer 12 can be obtained. Further, the transfer of ions between the first deformable material layer 11 and the second deformable material layer 12 through the intermediate layer 13 can be achieved more smoothly. As a result, the reliability and durability of the actuator 100 are enhanced.

The content of the electrolyte in the intermediate layer 13 is preferably 3% by mass or more and 80% by mass or less, more preferably 5% by mass or more and 30% by mass or less. According to this, the intermediate layer 13 can maintain the balance between the moderate flexibility and the electrical conductivity.

Further, the intermediate layer 13 preferably contains a solvent. According to this, the intermediate layer 13 can be adjusted to have a most suitable hardness, and the flexibility of the actuator 100 as a whole can be particularly enhanced. Further, in the case where the electrolyte which is in the form of a solid when it is present alone is contained, the solvent can favorably bring the electrolyte to a dissolved and ionized state in the intermediate layer 13.

Examples of the solvent can include organic solvents such as dimethyl sulfoxide (DMSO), toluene, benzene, dimethylformamide (DMF), dimethylacetamide (DMA), chloroform, dichloromethane, dichloroethane, acetone, propylene carbonate, methylpentanone, ethylpentanone, and acetonitrile. By using this, in the case where the electrolyte which is in the form of a solid when it is present alone is contained, the solvent can favorably bring the electrolyte to a dissolved and ionized state in the intermediate layer 13.

Further, in the case where the intermediate layer 13 contains a solvent, the solvent may be different from the solvent as the constituent component of the first deformable material layer 11 and the second deformable material layer 12, or may be the same solvent or the same type of solvent. According to this, the compatibility at the boundary surface between the intermediate layer 13 and the adjacent first deformable material layer 11 and the adjacent second deformable material layer 12 is enhanced. As a result, the adhesiveness between these layers is enhanced, and thus, the durability of the actuator 100 is improved.

The content of the solvent in the intermediate layer 13 is preferably 20% by mass or more and 80% by mass or less, more preferably 30% by mass or more and 60% by mass or less. According to this, the actuator 100 which has necessary and sufficient flexibility and strength is obtained.

Further, the intermediate layer 13 may be constituted by a material containing an ion exchanger which has a function of exchanging anions. The ion exchanger includes an anion exchange group which has a function of exchanging anions. Incidentally, the "ion" refers to a positively or negatively charged atom or atomic group, and the "anion" refers to a negatively charged atom or atomic group among the ions.

Figure 7A:
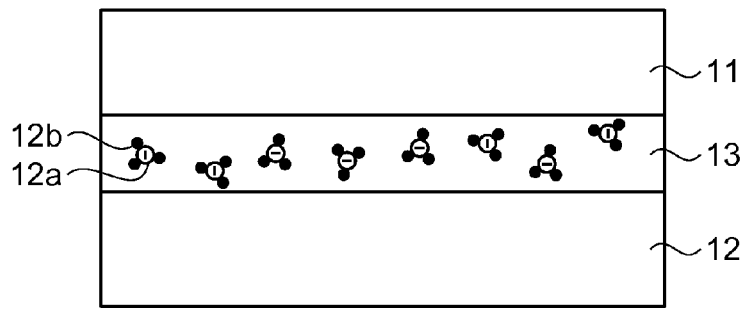
FIG. 7 shows cross-sectional views schematically showing the behavior of anions and a solvent constituting the actuator of the invention.
Figure 7B:
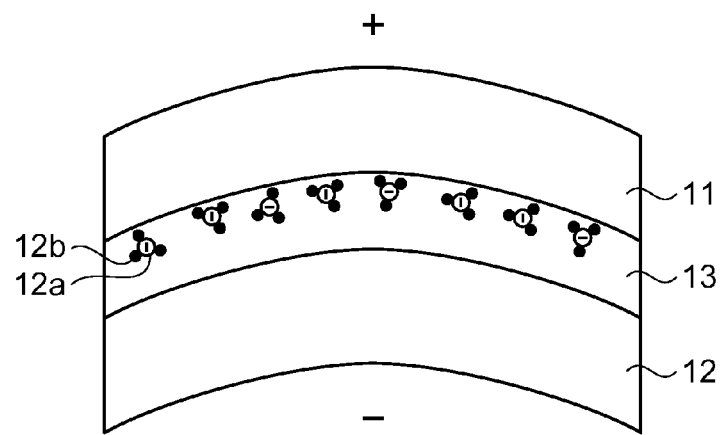
Figure 7C:
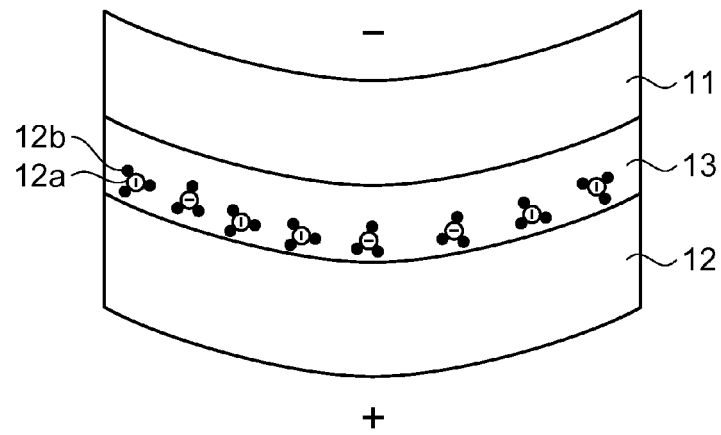

Since the intermediate layer 13 is constituted by a material containing an ion exchanger, the intermediate layer 13 per se can also be deformed, and therefore, the deformation amount of the actuator 100 as a whole can be further increased. The reason for this is considered to be as follows. As shown in FIG. 7(a), in the intermediate layer 13 constituting the actuator 100 in a state in which an electric current is never applied, anions and a solvent exist in a uniform state in the intermediate layer 13. When an electric current is applied to this intermediate layer 13, as shown in FIG. 7(b), the anions 12a contained in the intermediate layer 13 move to the positive electrode side, and also the solvent molecules 12b move in the intermediate layer 13 with the anions 12a. Due to this, a difference in the amount of solvent occurs between the positive electrode side and the negative electrode side in the intermediate layer 13. As a result, a portion on the positive electrode side where the content of the solvent molecules 12b is high is expanded, and a portion on the negative electrode side where the content of the solvent molecules 12b is low is contracted, and thus, the intermediate layer 13 is deformed and curved convexly toward the positive electrode side. Then, even if the application of the voltage is stopped, the shape of the intermediate layer 13 is maintained. Further, as shown in FIG. 7(c), the intermediate layer 13 can change the curved direction by switching the connection to the positive electrode and the negative electrode. That is, as shown in FIGS. 7(b) and 7(c), the motion of the intermediate layer 13 is reversible. Further, by continuously or intermittently inverting the characteristic of the electric current to be applied to the intermediate layer 13, the curved direction can be alternately and repeatedly changed, and the motion can be repeated and continued. Further, the reproducibility of the motion is also excellent. In the case where an electric current is applied to the actuator 100, the deformation direction of the intermediate layer 13 is the same as that of the first deformable material layer 11 and the second deformable material layer 12 described above, and therefore, the deformation amount of the whole actuator 100 can be further increased by combining both actions.

By exchanging the counterion (anion) of the anion exchange group of the ion exchanger with another anion (for example, an oxide ion or the like), the transfer of the counterion (anion) occurs. As a result, the anions contained in the intermediate layer 13 move to the positive electrode side, and the intermediate layer 13 per se can be deformed according to the principle as described above.

Examples of the ion exchanger having such a function include ion exchange resins such as an anion exchange resin and an amphoteric ion (anion and cation) exchange resin, organic ion exchangers such as a fatty acid amine, and inorganic ion exchangers such as zirconium hydroxide, hydrous bismuth oxide, and hydrotalcite, however, particularly, it is preferred to use at least one of an anion exchange resin and an amphoteric ion exchange resin, and it is more preferred to use an anion exchange resin. According to this, anions can be efficiently transferred in the intermediate layer 13, and also ions can be more smoothly transferred between the first deformable material layer 11 and the second deformable material layer 12 through the intermediate layer 13. Further, the response speed of the actuator 100 can be particularly increased even at a low voltage.

Examples of the anion exchange resin and the amphoteric ion (anion and cation) exchange resin serving as the ion exchanger having such a function include aliphatic ionens such as 3,4-ionen and 8,8-ionen, and a variety of ion exchange resins having, as a main backbone, poly(ethyleneimine hydrochloride), poly(vinylpyridinium chloride), poly(vinyltrimethylammonium chloride), poly(allyltrimethylammonium chloride), poly(oxyethyl-1-methylenetrimethylammonium chloride), poly(N-methylvinylpyridinium chloride), poly(oxyethyl-1-methylenepyridinium chloride), poly(2-hydroxy-3-methacryloxypropyltrimethylammonium chloride), poly(N-acrylamidopropyl-3-trimethylammonium chloride), poly(N,N-dimethyl-3,5-methylenepiperidinium chloride), poly(2-acryloxyethyldimethylsulfonium chloride), poly(glycidyldimethylsulfonium chloride), poly(glycidyltributylphosphonium chloride), polysulfone, or the like.

Further, in the case where the intermediate layer 13 contains an anion exchange resin or an amphoteric ion exchange resin, it may be configured such that an anion exchange group is introduced into a resin material containing carbon serving as a backbone.

In the case where the intermediate layer 13 contains an anion exchange resin or an amphoteric ion exchange resin, as the resin material to serve as a backbone, any of a variety of resin materials can be used. Examples thereof include polyolefin-based resins such as polyethylene and polypropylene, styrene-based resins such as polystyrene and a styrene-divinyl benzene copolymer, acrylic resins such as an acrylonitrile-divinyl benzene copolymer, vinyl chloride-based resins such as polyvinyl chloride, a vinyl chloride-vinyl acetate copolymer, a vinyl chloride-vinylidene chloride copolymer, and a vinyl chloride-olefin copolymer, fluorine-based resins such as polytetrafluoroethylene, polychlorotrifluoroethylene, polyvinylidene fluoride, a tetrafluoroethylene-hexafluoropropylene copolymer, a tetrafluoroethylene-perfluoroalkyl vinyl ether copolymer, a tetrafluoroethylene-ethylene copolymer, and a perfluorosulfonic acid-based resin, those obtained by substituting at least part of hydrogen atoms constituting the above resin materials with another atom such as fluorine, chlorine, bromine, oxygen, nitrogen, silicon, sulfur, boron, or phosphorus, copolymers thereof, polymer alloys thereof, and blended bodies thereof. In particular, it is preferred to use a styrene-based resin, and it is more preferred to use a styrene-divinyl benzene copolymer. According to this, the intermediate layer 13 can be made flexible, and therefore, the whole actuator 100 can be made flexible.

Examples of the anion exchange group include cationic groups such as nitrogen-based functional groups including an amino group, a substituted amino group, a quaternary ammonium group, a pyridyl group, an imidazole group, a quaternary pyridinium group, a quaternary imidazolium group, and the like, and phosphorus-based functional groups including a quaternary phosphonium group and the like. In particular, it is preferred to use at least one of a quaternary ammonium group and a quaternary phosphonium group, and it is more preferred to use a quaternary ammonium group. According to this, anions contained in the intermediate layer 13 reliably move to the positive electrode side, and therefore, the intermediate layer 13 per se can be more reliably deformed.

As the quaternary ammonium group, it is preferred to include one member or two or more members selected from the group consisting of trialkylammonium groups such as a trimethylammonium group, a triethylammonium group, a tripropylammonium group, a tributylammonium group, a trioctylammonium group, a diethylmethylammonium group, a dipropylmethylammonium group, a dibutylmethylammonium group, a dimethylethylammonium group, and a methyldi(hydroxyethyl)ammonium group. According to this, anions can be efficiently transferred in the intermediate layer 13, and also ions can be more smoothly transferred between the first deformable material layer 11 and the second deformable material layer 12 through the intermediate layer 13. As a result, the responsiveness of the actuator 100 is further enhanced.

In the case where an anion exchange resin or an amphoteric ion exchange resin is used, examples of the counterion (anion) include halide ions such as chloride ions, bromide ions, fluoride ions, and iodide ions, sulfate ions, nitrate ions, perchlorate ions, dodecylbenzenesulfonate ions, trifluoromethanesulfonate ions, hexafluorophosphate ($PF_6^-$), tetrafluoroboron ions ($BF_4^-$), and trifluoromethylsulfonyl amide ions ($TFSI^-$). In particular, it is preferred to use an electrolyte containing chloride ions, and it is more preferred to use lithium chloride, sodium chloride, or cesium chloride. According to this, the response speed of the intermediate layer 13 can be further increased, and also the displacement of the intermediate layer 13 can be further enhanced.

Incidentally, in the intermediate layer 13, these counter ions may all be the same, or some are different and may be substituted.

The form of the ion exchanger constituting the intermediate layer 13 is not particularly limited, however, examples thereof include various forms such as a particle, a plate, a fiber, a rod, and a disk. In particular, the ion exchanger is preferably in the form of a particle. According to this, it becomes easy to process the ion exchanger into the form of a sheet as shown in FIGS. 1, 2, and 7 by molding. In the case where the ion exchanger in the form of a particle is used, as the shape of the particle, either of a sphere or a non-sphere (for example, a scale, a spindle, or a spheroid) can be used. Further, the form of the particle is also not particularly limited, and may be in any form such as a dense, porous, or hollow form.

By using the ion exchanger in the form of a sheet (an ion exchange resin film), the thickness of the intermediate layer 13 can be made uniform, and in the case where the thickness of the intermediate layer 13 is set relatively thin, it is possible to reduce the weight of the actuator 100. As a result, the driving speed and the response speed of the intermediate layer 13 can be made faster even if the electric power is low.

Specific examples of the anion exchange resin in the form of a sheet include Aciplex A172 manufactured by Asahi Kasei Corporation, Selemion ASV manufactured by ASAHI GLASS CO., LTD., and Neosepta ACS manufactured by Tokuyama Corporation.

The content of the ion exchanger in the intermediate layer 13 is preferably 30% by mass or more and 90% by mass or less, more preferably 50% by mass or more and 70% by mass or less. According to this, anions can be efficiently transferred, and thus, the deformation amount of the actuator 100 can be increased. Meanwhile, if the anion exchange capacity of the ion exchanger is less than the above-described lower limit, the transfer of ions in the intermediate layer 13 is decreased, and a sufficient enhancement of deformation of the intermediate layer 13 per se is not observed. On the other hand, if the anion exchange capacity of the ion exchanger exceeds the above-described upper limit, a further improvement of the effect as described above is not observed.

The anion exchange capacity of the ion exchanger is preferably 0.5 meq/g or more and 3.0 meq/g or less, and particularly preferably 0.8 meq/g or more and 2.2 meq/g or less. According to this, by providing a necessary concentration of the ion exchanger, the transfer of anions in the intermediate layer 13 can be improved. Further, the transfer of ions can be more smoothly achieved between the first deformable material layer 11 and the second deformable material layer 12 through the intermediate layer 13. Meanwhile, if the anion exchange capacity of the ion exchanger is less than the above-described lower limit, the transfer of anions in the intermediate layer 13 is decreased, and therefore, it is necessary to increase the content of the ion exchanger in the intermediate layer 13. On the other hand, if the anion exchange capacity of the ion exchanger exceeds the above-described upper limit, the actuator 100 may be deteriorated.

The intermediate layer 13 may contain a component other than the above-described components (other component).

Examples of such a component include a colorant. In particular, the intermediate layer 13 may contain a colorant. By doing this, the intermediate layer 13 can have a light shielding property (concealing property), and therefore, it can be easily recognized which of the first deformable material layer 11 and the second deformable material layer 12 changes its color tone.

Examples of the colorant include titanium oxide, white lead, zinc oxide, lithopone, zinc sulfide, antimony oxide, calcium carbonate, kaolin, mica, barium sulfate, alumina, talc, silica, calcium silicate, and gloss white, however, it is preferred to use a white material (for example, titanium oxide, white lead, zinc oxide, lithopone, zinc sulfide, antimony oxide, calcium carbonate, kaolin, mica, barium sulfate, alumina, talc, silica, calcium silicate, gloss white, or the like). According to this, the effect as described above is more prominently exhibited.

The thickness of the intermediate layer 13 is not particularly limited, however, in the case of the intermediate layer 13 which satisfies the conditions as described above, the thickness is preferably 0.01 mm or more and 10 mm or less, more preferably 0.01 mm or more and 1 mm or less. According to this, the effect as described above is more prominently exhibited. In addition, the thickness of the actuator 100 can be further decreased while allowing the intermediate layer 13 to reliably exhibit its function.

The intermediate layer 13 is provided between the first deformable material layer 11 and the second deformable material layer 12 and is in contact therewith or is closely adhered thereto.

In FIGS. 1 and 2, the boundary surface between the intermediate layer 13 and the first deformable material layer 11 is clearly shown, however, such a clear boundary surface may not necessarily be present, and around the boundary surface, the materials (components) of the first deformable material layer 11 and the intermediate layer 13 may exist in an intermingled state. That is, around the boundary surface between the first deformable material layer 11 and the intermediate layer 13, part of these components may gradually change in the thickness direction (so-called a gradient material). Further, on the boundary surface of these layers, irregularities may be provided so that the material of one layer penetrates into the material of the other layer. According to this, the adhesiveness between the first deformable material layer and the intermediate layer 13 can be particularly enhanced. In addition, the transfer of ions between the first deformable material layer 11 and the intermediate layer 13 is smoothly achieved. Incidentally, the same shall apply also to the boundary surface between the second deformable material layer 12 and the intermediate layer 13.

The form of the actuator 100 is not particularly limited, and may be any of various forms such as a fiber, a sheet, a plate, and a rod, and the thickness of the deformable material may be relatively large.

Each of the first deformable material layer 11, the second deformable material layer 12, and the intermediate layer 13 may have a uniform thickness, or may have a partially different thickness.

In the configuration provided with the intermediate layer 13 as in this embodiment, ions can be transferred between the first deformable material layer 11 and the second deformable material layer 12 through the intermediate layer 13, and thus, an electric current can flow smoothly and stably. Further, the adhesiveness of the intermediate layer 13 to the first deformable material layer 11 and the second deformable material layer 12 is enhanced.

In particular, by the existence of the intermediate layer 13 as described above, even in the case where the thickness of the first deformable material layer 11 and the second deformable material layer 12, and the thickness of the actuator 100 are relatively large, the whole deformable material constituting the first deformable material layer 11 and the second deformable material layer 12 can be efficiently deformed. In addition, a sufficiently large displacement amount can be obtained at a low voltage, and also the response speed of the deformable material can be increased.

Further, by adopting a three-layer structure, that is, by providing the first deformable material layer 11 and the second deformable material layer 12 through the intermediate layer 13, the deformable material layer is not merely expanded or contracted in one direction, but can be curved or bent in the reverse direction.

Next, with reference to FIGS. 1 and 2, the operation of the actuator 100 (driving device 200) will be described.

In the case where the stimulus-responsive compound which constitutes the first deformable material layer 11 and the second deformable material layer 12 is a compound which is extended (expanded) by oxidation and contracted by reduction (for example, in the case where the compound has a structure as shown in FIGS. 3 to 6 as described above), the actuator 100 (driving device 200) as a whole shows the following behavior.

That is, in the structure shown in FIG. 1, when the switch 14 is turned on, the first deformable material layer 11 is connected to the positive electrode of the power source 10, and an electric current flows through the first deformable material layer 11, the intermediate layer 13, and the second deformable material layer 12. In the stimulus-responsive compound which constitutes the first deformable material layer 11, the molecular chain is extended (expanded) by an oxidation reaction, and as a result, the whole first deformable material layer 11 is extended (expanded). On the other hand, in the stimulus-responsive compound which constitutes the second deformable material layer 12, the molecular chain is contracted by a reduction reaction, and as a result, the whole second deformable material layer 12 is contracted. In this manner, the whole actuator 100 is curved convexly toward the first deformable material layer 11 side (the upper side in the drawing).

In the structure shown in FIG. 2, when the switch 14 is turned on, the polarity is inverted from that in FIG. 1, and the first deformable material layer 11 is connected to the negative electrode of the power source 10, and an electric current flows through the first deformable material layer 11, the intermediate layer 13, and the second deformable material layer 12. In the stimulus-responsive compound which constitutes the first deformable material layer 11, the molecular chain is contracted by a reduction reaction, and as a result, the whole first deformable material layer 11 is contracted. On the other hand, in the stimulus-responsive compound which constitutes the second deformable material layer 12, the molecular chain is extended (expanded) by an oxidation reaction, and as a result, the whole second deformable material layer 12 is extended (expanded). In this manner, the whole actuator 100 is curved convexly toward the second deformable material layer 12 side (the left side in the drawing).

In this manner, the curved direction of the actuator 100 can be changed by switching the connection to the positive electrode and the negative electrode. Such a motion is reversible. Further, by continuously or intermittently inverting the characteristic of the electric current to be applied to the actuator 100, the curved direction can be alternately and repeatedly changed, and the motion can be repeated and continued. Further, the reproducibility of the motion is also excellent.

As described above, in the actuator 100 including the first deformable material layer 11, the second deformable material layer 12, and the intermediate layer 13, one deformable material layer is transformed into a state in which the molecular chain is extended (expanded), and the other deformable material layer is transformed into a state in which the molecular chain is contracted. In this manner, by bringing the first deformable material layer 11 and the second deformable material layer 12 to the states opposite to each other, respectively, the deformation ratio of the actuator 100 can be increased. Moreover, since the first deformable material layer 11 and the second deformable material layer 12 use the materials as described above, the ratio of expansion and contraction of each of the deformable materials can be increased. Accordingly, by the synergistic effect of these, the deformation ratio of the actuator 100 can be further increased.

Further, accompanying the deformation of the stimulus-responsive compound according to an oxidation-reduction reaction as described above, the color tone of the stimulus-responsive compound is changed, and as a result, the color tone of the whole deformable material layer is also changed.

The voltage to be applied to the actuator 100 is preferably, for example, 0.1 V or more and 10 V or less, more preferably 1 V or more and 5 V or less. According to this, a necessary and sufficient deformation amount of the actuator 100 is obtained.

The application of an electric current to the actuator 100 is not limited only to the use of a direct current as described above, but the use of an alternating current or the like is also possible. The "alternating current" as used herein refers to an electric current which changes its magnitude and direction periodically over time such as a sine-wave alternating current and a pulsating rectangular-wave current.

The frequency of the alternating current is not particularly limited and may be determined in consideration of the responsiveness of the actuator 100, and can be set to, for example, 0.01 Hz or more and 100 Hz or less. According to this, the application of an electric current suitable for the responsiveness of the actuator 100 becomes possible, and a smooth and continuous inversion motion becomes possible.

Hereinabove, preferred embodiments of the invention are described, however, the invention is not limited thereto.

For example, in the above-described embodiments, a case where the stimulus-responsive compound contains the unit A, the first unit B, the second unit B, the first unit C, and the second unit C is mainly described. However, in the invention, the stimulus-responsive compound may be any as long as its molecular structure is changed according to an oxidation-reduction reaction, and the stimulus-responsive compound is not limited to those having all of the above-described respective units.

In the above-described embodiments, the description is made by assuming that a wiring extracted from the power source 10 is in contact with the deformable material layers (the first deformable material layer and the second deformable material layer), however, for example, an electrically conductive film (for example, a metal film or the like) may be provided on a surface opposite to the surface facing the intermediate layer of the deformable material layer. According to this, the response speed of the actuator can be further increased.

EXAMPLES

Hereinafter, the invention will be described in more detail with reference to Examples, however, the invention is not limited only to these Examples.

Example 1

[1] Production of Stimulus-Responsive Compound
[1.1] Synthesis of Unit A

By using bromothiophene as a starting material, dimerization and bromination were performed using a catalyst containing zinc and nickel. Then, the introduction of an aldehyde group (formylation) was performed using DMF.

Subsequently, acetal protection of the aldehyde group using ethylene glycol was performed, and further bromine was replaced by a formyl group. Thereafter, by a reduction reaction with $NaBF_4$, a diol having two hydroxy groups in a bithiophene backbone was obtained.

[1.2] Synthesis of Unit C and Unit D

First, n-butyl lithium was allowed to act on 2,3-difluorobenzene, and the resulting compound was treated with trimethyl borate, whereby 2,3-difluoroboronic acid was obtained.

Subsequently, 4-alkoxy-1-bromobenzene was reacted with the obtained 2,3-difluoroboronic acid in the presence of a palladium catalyst, whereby 4-(4-alkoxyphenyl)-2,3-difluorobenzene was obtained.

Subsequently, n-butyl lithium was allowed to act on the obtained 4-(4-alkoxyphenyl)-2,3-difluorobenzene, and the resulting compound was treated with trimethyl borate, whereby 4-(4-alkoxyphenyl)-2,3-difluoroboronic acid was obtained.

Subsequently, 4-bromophenol was reacted with the obtained 4-(4-alkoxyphenyl)-2,3-difluoroboronic acid in the presence of palladium, whereby 1-hydroxy-4-[4-(4-alkoxyphenyl-2,3-difluorophenyl]benzene was obtained.

Subsequently, the obtained 1-hydroxy-4-[4-(4-alkoxyphenyl-2,3-difluorophenyl]benzene and an oligoethylene glycol terminated with bromine were reacted with each other, whereby a liquid crystalline compound terminated with an oligoethylene chain was obtained. Further, by a reaction with p-toluenesulfonyl chloride, a liquid crystalline compound terminated with a p-toluenesulfonyl group was obtained

[1.3] Production of Stimulus-Responsive Compound

The diol synthesized in the above [1.1] and the liquid crystalline compound synthesized in the above [1.2] were reacted with each other in dimethylformamide (DMF) in the presence of sodium hydride, whereby a bithiophene derivative into which a liquid crystalline molecule was introduced was obtained.

Thereafter, the obtained bithiophene derivative was reacted with benzene dithiol in the presence of an acid catalyst, and the resulting compound was treated with 2,3-dichloro-5,6-dicyano-p-benzoquinone (DDQ). Then, boron tetrafluoride was added thereto, whereby a stimulus-responsive compound (bithiophene derivative) represented by the following formula (17) having a unit A, units B (a first unit B and a second unit B), units C (a first unit C and a second unit C), and units D (a first unit D and a second unit D) was obtained.

In the formula (17), n is 4.

[Chem. 19]

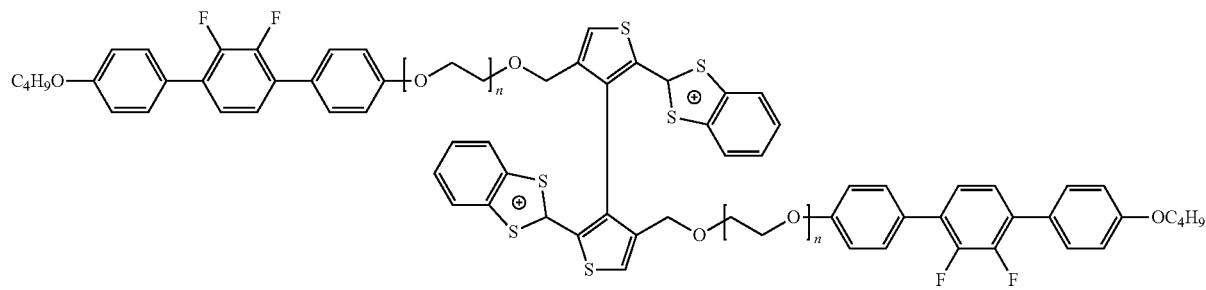

(17)

[2] Preparation of Polymeric Material
[2.1] Synthesis of Monomer 1-(8-Hydroxyoctyl-1-oxy)-4-[2,3-difuloro-4-(4-butoxy phenyl)phenyl]benzene (the following formula (18)) and triethylamine were dissolved in THF, and the resulting mixture was cooled to 0° C., and then, acryloyl chloride was added dropwise thereto. After the mixture was stirred for 4 hours, water was added thereto, and extraction with dichloromethane was performed three times. The organic layer was washed with water and a saturated aqueous sodium chloride solution, and then, dehydrated with sodium sulfate, and concentrated by filtration. Then, the concentrated mixture was purified by column chromatography, whereby a target compound was obtained.

In the formula (18), R is $C_4H_9$.

[Chem. 20]

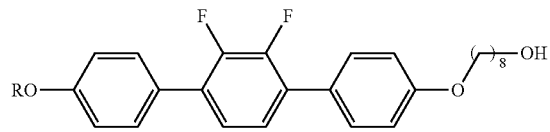

(18)

In this manner, a monomer represented by the above formula (6) (wherein n is 8, and R is $C_4H_9$) was obtained.

[2.2] Production of Liquid Crystal Polymer

The monomer (100 parts by mass) obtained above, bisacryloyloxyhexane (10 parts by mass) as a cross-linking agent, and azobisisobutyronitrile (1 part by mass) as an initiator were placed in a Schlenk flask and dissolved in toluene, and then, dissolved oxygen in the solvent was removed by three cycles of freeze-pump-thaw degassing. Thereafter, the resulting solution was stirred under a nitrogen atmosphere at 95° C. for 26 hours. After the solution was cooled, the solvent was distilled off, and the resulting residue was dissolved in a minimum amount of tetrahydrofuran. The resulting solution was added dropwise to acetone, and the deposited precipitate was filtered and then dried under vacuum, whereby a liquid crystal polymer (weight average molecular weight: 30,000) was obtained.

[2.3] Mixing of Liquid Crystal Polymer and Vinylidene Fluoride-Propylene Hexafluoride Copolymer Thereafter, the liquid crystal polymer obtained as described above (1 part by weight) and a vinylidene fluoride-propylene hexafluoride copolymer (weight average molecular weight: 150,000, 2 parts by weight) were mixed with each other.

[3] Production of Deformable Material

The stimulus-responsive compound obtained as described above, the liquid crystalline polymer, the vinylidene fluoride-propylene hexafluoride copolymer, ITO particles having an average particle diameter of 100 nm, propylene carbonate as a solvent, and $TBAPF_6$ (tetra-n-butylammonium hexafluorophosphate) as an electrolyte were mixed. Thereafter, the resulting mixture was molded using a mold having a given shape, whereby a deformable material in the form of a gel was obtained.

[4] Production of Material for Forming Intermediate Layer

On the other hand, the same vinylidene fluoride-propylene hexafluoride copolymer (weight average molecular weight: 150,000) as used in the preparation of the deformable material was prepared and mixed with propylene carbonate as a solvent and $TBAPF_6$ (tetra-n-butylammonium hexafluorophosphate) as an electrolyte. Thereafter, the resulting mixture was molded using a mold having a given shape, whereby a material (a material for forming an intermediate layer) in the form of a gel was obtained.

[5] Production of Actuator

By using the deformable material and the material for forming an intermediate layer obtained as described above, an actuator and a driving device as shown in FIGS. 1 and 2 were produced.

The material for forming an intermediate layer obtained as described above was cut into a piece with a size of 2.2 cm in length, 0.4 cm in width, and 0.02 mm in thickness, and a piece obtained by cutting the deformable material obtained as described above into a size of 2.2 cm in length, 0.2 cm in width, and 0.05 mm in thickness was bonded to both surfaces thereof, whereby an actuator as shown in FIGS. 1 and 2 was produced.

Examples 2 to 9

Actuators were produced in the same manner as in the above-described Example 1 except that the configurations of the first deformable material layer, the second deformable material layer, and the intermediate layer were changed as shown in Tables 1 to 4.

Example 10

Aciplex A172 (anion exchange capacity: 0.18 to 0.19 meq/g, length: 2.2 cm, width: 0.4 cm, thickness: 0.14 mm) manufactured by Asahi Kasei Corporation as an anion exchange resin obtained by introducing a quaternary ammonium group into a styrene-divinyl benzene copolymer was prepared, and a piece obtained by cutting the deformable material obtained as described in the above Example 1 into a size of 2.2 cm in length, 0.2 cm in width, and 0.05 mm in thickness was bonded to both surfaces thereof, whereby a first deformable material layer and a second deformable material layer were formed.

Thereafter, LiCl as an electrolyte was dissolved in ion exchanged water as a polar solvent, whereby a 0.1 M LiCl aqueous solution was obtained. In this LiCl aqueous solution, the above-prepared material was immersed for 24 hours, thereby to exchange the counterion (anion) of the anion exchange resin with a Cl ion, whereby an actuator as shown in FIGS. 1 and 2 was produced.

Examples 11 to 14

Actuators were produced in the same manner as in the above-described Example 10 except that the configurations of the first deformable material layer, the second deformable material layer, and the intermediate layer were changed as shown in Tables 1, 3, and 4.

Comparative Example 1

Actuators were produced in the same manner as in the above-described Example 1 except that the first deformable material layer and the second deformable material layer were bonded to each other without interposing the intermediate layer therebetween.

In Tables 1 and 2, the compositions of the deformable material layers (the first deformable material layer and the second deformable material layer) constituting the actuators of the above-described respective Examples and Comparative Example, and the electrical conductivities thereof are shown, in Table 3, the compositions of the intermediate layers constituting the actuators of the above-described respective Examples and Comparative Example are shown, and in Table 4, the thicknesses of the respective members constituting the actuators of the above-described respective Examples and Comparative Example are shown. In the tables, the compound (stimulus-responsive compound) represented by the above formula (17) is expressed as "A1", the compound (stimulus-responsive compound) represented by the following formula (19) is expressed as "A2", the compound (stimulus-responsive compound) represented by the following formula (20) is expressed as "A3", the compound (stimulus-responsive compound) represented by the following formula (21) is expressed as "A4", the monomer represented by the above formula (6) is expressed as "M1", the monomer represented by the above formula (7) is expressed as "M2", bisacryloyloxyhexane as the cross-linking agent is expressed as "B1", the vinylidene fluoride-propylene hexafluoride copolymer (weight average molecular weight: 150,000) is expressed as "PVdF", the styrene-divinyl benzene copolymer (having a quaternary ammonium group as an anion exchange group) as the resin material constituting the ion exchanger is expressed as "J1", ITO particles having an average particle diameter of 100 nm as the electronically conductive substance is expressed as "C1", ITO particles having an average particle diameter of 20 nm as the electronically conductive substance is expressed as "C2", ITO particles having an average particle diameter of 1000 nm as the electronically conductive substance is expressed as "C3", ZnO particles having an average particle diameter of 100 nm as the electronically conductive substance is expressed as "C4", AZO particles having an average particle diameter of 100 nm as the electronically conductive substance is expressed as "C5", propylene carbonate as the solvent is expressed as "S1", tetra-n-butylammonium hexafluorophosphate (TBAPF$_6$) as the electrolyte is expressed as "E1", and titanium oxide as the colorant is expressed as "TiO$_2$". Further, in the column of the visible light transmittance in the table, the visible light transmittance (wavelength: 633 nm) of a film when the electronically conductive substance is formed into a film having a thickness of 0.1 mm is shown. Further, the deformable material layers constituting the actuators of the above-described respective Examples and Comparative Example were all in the form of a gel, and the intermediate layers constituting the actuators of the above-described respective Examples were all in the form of a gel. Further, the polymeric materials, the solvents, and the electrolytes constituting the deformable materials of the above-described respective Examples and Comparative Example all had a visible light (wavelength: 633 nm) transmittance (visible light transmittance when the thickness was 0.1 mm) of 40% or more.

[Chem. 21]

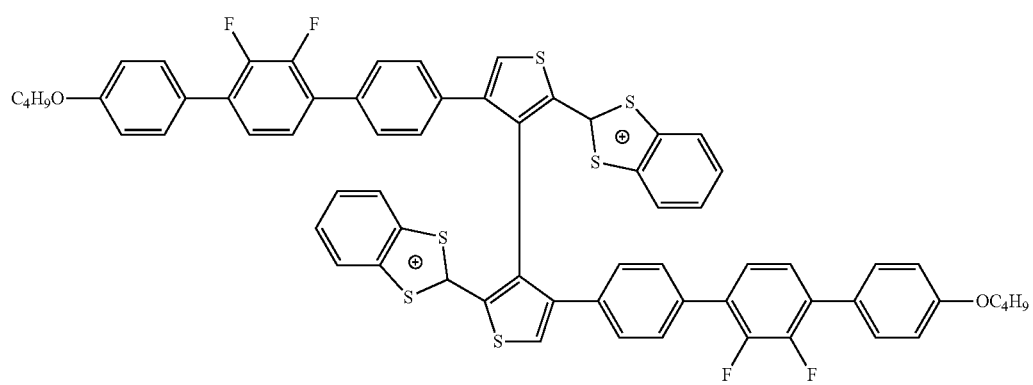

(19)

-continued

[Chem. 22]

(20)

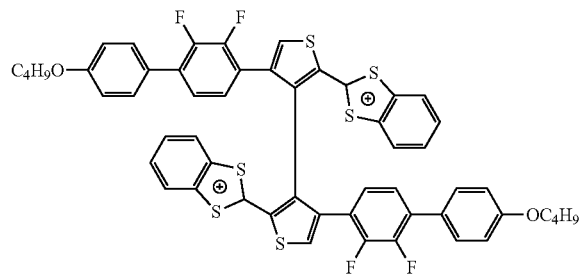

[Chem. 23]

(21)

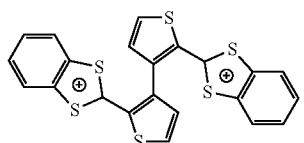

TABLE 1

| | | Constituent material of deformable material layer | | | | | | | |
|---|---|---|---|---|---|---|---|---|---|
| | | Stimulus-responsive compound | | Polymeric material | | | | | Electronically conductive substance Type |
| | | | | Liquid crystal polymer | | | | Other polymeric material | |
| | | Type | Content [% by mass] | Constituent monomer | Cross-linking agent | Mw | Content [% by mass] | Type | Content [% by mass] | |
| Example 1 | First deformable material layer | A1 | 20 | M1 | B1 | 30,000 | 5 | PVdf | 10 | C1 |
| | Second deformable material layer | A1 | 20 | M1 | B1 | 30,000 | 5 | PVdf | 10 | C1 |
| Example 2 | First deformable material layer | A2 | 20 | M2 | B1 | 30,000 | 5 | PVdf | 10 | C1 |
| | Second deformable material layer | A2 | 20 | M2 | B1 | 30,000 | 5 | PVdf | 10 | C1 |
| Example 3 | First deformable material layer | A3 | 20 | M2 | B1 | 30,000 | 5 | PVdf | 10 | C1 |
| | Second deformable material layer | A3 | 20 | M2 | B1 | 30,000 | 5 | PVdf | 10 | C1 |
| Example 4 | First deformable material layer | A4 | 20 | M2 | B1 | 30,000 | 5 | PVdf | 10 | C1 |
| | Second deformable material layer | A4 | 20 | M2 | B1 | 30,000 | 5 | PVdf | 10 | C1 |
| Example 5 | First deformable material layer | A1 | 20 | M2 | B1 | 30,000 | 5 | PVdf | 10 | C1 |
| | Second deformable material layer | A1 | 20 | M2 | B1 | 30,000 | 5 | PVdf | 10 | C1 |
| Example 6 | First deformable material layer | A1 | 20 | M2 | B1 | 30,000 | 5 | PVdf | 10 | C1 |
| | Second deformable material layer | A1 | 20 | M2 | B1 | 30,000 | 5 | PVdf | 10 | C1 |
| Example 7 | First deformable material layer | A1 | 20 | M1 | B1 | 30,000 | 5 | PVdf | 10 | C2 |
| | Second deformable material layer | A1 | 20 | M1 | B1 | 30,000 | 5 | PVdf | 10 | C2 |

| | | Constituent material of deformable material layer | | | | | | |
|---|---|---|---|---|---|---|---|---|
| | | Electronically conductive substance | | | Solvent | | Electrolyte | | Electrical conductivity [S/cm] |
| | | Visible light transmittance [%] | Particle diameter [nm] | Content [% by mass] | Type | Content [% by mass] | Type | Content [% by mass] | |
| Example 1 | First deformable material layer | 45 | 100 | 30 | S1 | 30 | E1 | 5 | 6 |
| | Second deformable material layer | 45 | 100 | 30 | S1 | 30 | E1 | 5 | 6 |
| Example 2 | First deformable material layer | 45 | 100 | 30 | S1 | 30 | E1 | 5 | 7 |
| | Second deformable material layer | 45 | 100 | 30 | S1 | 30 | E1 | 5 | 7 |

TABLE 1-continued

| | | | | | | | | | |
|---|---|---|---|---|---|---|---|---|---|
| Example 3 | First deformable material layer | 45 | 100 | 30 | S1 | 30 | E1 | 5 | 6 |
| | Second deformable material layer | 45 | 100 | 30 | S1 | 30 | E1 | 5 | 6 |
| Example 4 | First deformable material layer | 45 | 100 | 30 | S1 | 30 | E1 | 5 | 5 |
| | Second deformable material layer | 45 | 100 | 30 | S1 | 30 | E1 | 5 | 5 |
| Example 5 | First deformable material layer | 45 | 100 | 30 | S1 | 30 | E1 | 5 | 6 |
| | Second deformable material layer | 45 | 100 | 30 | S1 | 30 | E1 | 5 | 6 |
| Example 6 | First deformable material layer | 45 | 100 | 30 | S1 | 30 | E1 | 5 | 5 |
| | Second deformable material layer | 45 | 100 | 30 | S1 | 30 | E1 | 5 | 5 |
| Example 7 | First deformable material layer | 45 | 20 | 30 | S1 | 30 | E1 | 5 | 30 |
| | Second deformable material layer | 45 | 20 | 30 | S1 | 30 | E1 | 5 | 30 |

TABLE 2

| | | Constituent material of deformable material layer | | | | | | | |
|---|---|---|---|---|---|---|---|---|---|
| | | Stimulus-responsive compound | | Polymeric material | | | | | Electronically conductive substance Type |
| | | | | Liquid crystal polymer | | | | Other polymeric material | |
| | | Type | Content [% by mass] | Constituent monomer | Cross-linking agent | Mw | Content [% by mass] | Type | Content [% by mass] | |
| Example 8 | First deformable material layer | A1 | 20 | M1 | B1 | 30,000 | 5 | PVdf | 10 | C1 |
| | Second deformable material layer | A1 | 20 | M1 | B1 | 30,000 | 5 | PVdf | 10 | C1 |
| Example 9 | First deformable material layer | A1 | 20 | M1 | B1 | 30,000 | 5 | PVdf | 10 | C1 |
| | Second deformable material layer | A1 | 20 | M1 | B1 | 30,000 | 5 | PVdf | 10 | C1 |
| Example 10 | First deformable material layer | A1 | 20 | M1 | B1 | 30,000 | 5 | PVdf | 10 | C1 |
| | Second deformable material layer | A1 | 20 | M1 | B1 | 30,000 | 5 | PVdf | 10 | C1 |
| Example 11 | First deformable material layer | A1 | 20 | M1 | B1 | 30,000 | 5 | PVdf | 10 | C3 |
| | Second deformable material layer | A1 | 20 | M1 | B1 | 30,000 | 5 | PVdf | 10 | C3 |
| Example 12 | First deformable material layer | A1 | 20 | M1 | B1 | 30,000 | 5 | PVdf | 10 | C4 |
| | Second deformable material layer | A1 | 20 | M1 | B1 | 30,000 | 5 | PVdf | 10 | C4 |
| Example 13 | First deformable material layer | A1 | 20 | M1 | B1 | 30,000 | 5 | PVdf | 10 | C5 |
| | Second deformable material layer | A1 | 20 | M1 | B1 | 30,000 | 5 | PVdf | 10 | C5 |
| Example 14 | First deformable material layer | A1 | 20 | M1 | B1 | 30,000 | 5 | PVdf | 10 | C1 |
| | Second deformable material layer | A2 | 20 | M2 | B1 | 30,000 | 5 | PVdf | 10 | C1 |
| Comparative Example 1 | First deformable material layer | A1 | 20 | M1 | B1 | 30,000 | 5 | PVdf | 10 | C1 |
| | Second deformable material layer | A1 | 20 | M1 | B1 | 30,000 | 5 | PVdf | 10 | C1 |

TABLE 2-continued

| | | Constituent material of deformable material layer | | | | | | |
|---|---|---|---|---|---|---|---|---|
| | | Electronically conductive substance | | | Solvent | | Electrolyte | |
| | | Visible light (633 nm) transmittance [%] | Particle diameter [nm] | Content [% by mass] | Type | Content [% by mass] | Type | Content [% by mass] | Electrical conductivity [S/cm] |

| | | Visible light (633 nm) transmittance [%] | Particle diameter [nm] | Content [% by mass] | Solvent Type | Solvent Content [% by mass] | Electrolyte Type | Electrolyte Content [% by mass] | Electrical conductivity [S/cm] |
|---|---|---|---|---|---|---|---|---|---|
| Example 8 | First deformable material layer | 45 | 100 | 30 | S1 | 30 | E1 | 5 | 6 |
| | Second deformable material layer | 45 | 100 | 30 | S1 | 30 | E1 | 5 | 6 |
| Example 9 | First deformable material layer | 45 | 100 | 30 | S1 | 30 | E1 | 5 | 6 |
| | Second deformable material layer | 45 | 100 | 30 | S1 | 30 | E1 | 5 | 6 |
| Example 10 | First deformable material layer | 45 | 100 | 30 | S1 | 30 | E1 | 5 | 5 |
| | Second deformable material layer | 45 | 100 | 30 | S1 | 30 | E1 | 5 | 5 |
| Example 11 | First deformable material layer | 30 | 1000 | 30 | S1 | 30 | E1 | 5 | 0.8 |
| | Second deformable material layer | 30 | 1000 | 30 | S1 | 30 | E1 | 5 | 0.8 |
| Example 12 | First deformable material layer | 25 | 100 | 30 | S1 | 30 | E1 | 5 | 0.5 |
| | Second deformable material layer | 25 | 100 | 30 | S1 | 30 | E1 | 5 | 0.5 |
| Example 13 | First deformable material layer | 20 | 100 | 30 | S1 | 30 | E1 | 5 | 0.08 |
| | Second deformable material layer | 20 | 100 | 30 | S1 | 30 | E1 | 5 | 0.08 |
| Example 14 | First deformable material layer | 45 | 100 | 30 | S1 | 30 | E1 | 5 | 6 |
| | Second deformable material layer | 45 | 100 | 30 | S1 | 30 | E1 | 5 | 7 |
| Comparative Example 1 | First deformable material layer | 45 | 100 | 30 | S1 | 30 | E1 | 5 | 5 |
| | Second deformable material layer | 45 | 100 | 30 | S1 | 30 | E1 | 5 | 5 |

TABLE 3

| | Constituent material of intermediate layer | | | | | | | |
|---|---|---|---|---|---|---|---|---|
| | Polymeric material | | Electrolyte | | Solvent | | Colorant | |
| | Type | Content [% by mass] | Type | Content [% by mass] | Type | Content [% by mass] | Type | Content [% by mass] |
| Example 1 | PVdf | 65 | E1 | 5 | S1 | 30 | — | — |
| Example 2 | PVdf | 65 | E1 | 5 | S1 | 30 | — | — |
| Example 3 | PVdf | 65 | E1 | 5 | S1 | 30 | — | — |
| Example 4 | PVdf | 65 | E1 | 5 | S1 | 30 | — | — |
| Example 5 | PVdf | 65 | E1 | 5 | S1 | 30 | — | — |
| Example 6 | PVdf | 65 | E1 | 5 | S1 | 30 | — | — |
| Example 7 | PVdf | 65 | E1 | 5 | S1 | 30 | — | — |
| Example 8 | PVdf | 60 | E1 | 5 | S1 | 30 | $TiO_2$ | 5 |
| Example 9 | PVdf | 50 | E1 | 5 | S1 | 30 | $TiO_2$ | 15 |
| Example 10 | J1 | 60 | E1 | 5 | S1 | 35 | — | — |
| Example 11 | PVdf | 65 | E1 | 5 | S1 | 30 | — | — |
| Example 12 | PVdf | 65 | E1 | 5 | S1 | 30 | — | — |
| Example 13 | PVdf | 65 | E1 | 5 | S1 | 30 | — | — |
| Example 14 | PVdf | 65 | E1 | 5 | S1 | 30 | — | — |
| Comparative Example 1 | — | — | — | — | — | — | — | — |

TABLE 4

| | First deformable material layer Thickness [mm] | Intermediate layer Thickness [mm] | Second deformable material layer Thickness [mm] |
|---|---|---|---|
| Example 1 | 0.05 | 0.02 | 0.05 |
| Example 2 | 0.05 | 0.02 | 0.05 |
| Example 3 | 0.05 | 0.02 | 0.05 |
| Example 4 | 0.05 | 0.02 | 0.05 |
| Example 5 | 0.02 | 0.03 | 0.02 |
| Example 6 | 0.05 | 0.02 | 0.05 |
| Example 7 | 0.05 | 0.02 | 0.05 |
| Example 8 | 0.05 | 0.02 | 0.05 |
| Example 9 | 0.05 | 0.02 | 0.05 |
| Example 10 | 0.05 | 0.14 | 0.05 |
| Example 11 | 0.05 | 0.02 | 0.05 |
| Example 12 | 0.05 | 0.02 | 0.05 |
| Example 13 | 0.05 | 0.02 | 0.05 |
| Example 14 | 0.05 | 0.02 | 0.05 |
| Comparative Example 1 | 0.05 | — | 0.05 |

[6] Evaluation of Actuators

[6.1] Deformation Amount

In an environment at 25° C., the direction of flow of an electric current was inverted as shown in FIG. 2 from the state shown in FIG. 1, and the displacement in the curved direction (the longitudinal direction in FIGS. 1 and 2) at a place 10mm away from a contact point between the actuator and the external electrode (a place indicated by X in FIGS. 1 and 2) was observed using a laser displacement meter, and the evaluation was performed according to the following criteria. Incidentally, the applied voltage was set to 3 V.

A: The displacement amount is 8 mm or more.
B: The displacement amount is 6 mm or more and less than 8 mm.
C: The displacement amount is 4 mm or more and less than 6 mm.
D: The displacement amount is 2 mm or more and less than 4 mm.
E: The displacement amount is less than 2 mm.

[6.2] Discoloration of Deformable Material Layer

In an environment at 25° C., a change in the color tone when the direction of flow of an electric current was inverted as shown in FIG. 2 from the state shown in FIG. 1 was visually observed, and the evaluation was performed according to the following criteria. Incidentally, the applied voltage was set to 3 V.

A: A remarkable change in the color tone is observed.
B: A change in the color tone is clearly observed.
C: A change in the color tone is slightly observed.
D: A change in the color tone is hardly observed.
E: A change in the color tone is not at all observed.

These results are summarized in Table 5.

TABLE 5

| | Deformation amount | Discoloration |
|---|---|---|
| Example 1 | A | A |
| Example 2 | B | A |
| Example 3 | C | A |
| Example 4 | C | A |
| Example 5 | C | A |
| Example 6 | D | A |
| Example 7 | A | A |
| Example 8 | C | A |
| Example 9 | C | A |
| Example 10 | B | A |
| Example 11 | C | C |
| Example 12 | D | C |
| Example 13 | D | C |
| Example 14 | B | A |
| Comparative Example 1 | E | E |

As apparent from Table 5, according to the invention, the actuator can be largely displaced at a relatively low voltage, and also even if the thickness of the deformable material layer was large, the whole deformable material layer could be efficiently deformed, and a sufficiently large displacement force and displacement amount could be obtained at a low voltage. Further, according to the invention, the actuator had an excellent response speed. In addition, according to the invention, the operability in a low-temperature range and also the durability were excellent. Further, according to the invention, accompanying a change in the oxidized or reduced state of the stimulus-responsive compound, the color tone of the whole deformable material is changed. Therefore, the oxidized or reduced state of the stimulus-responsive compound could be easily and reliably recognized in appearance. In particular, in Example 14 in which the composition of the stimulus-responsive compound was made different between the first deformable material layer and the second deformable material layer, the deformed direction could be favorably determined according to the color tone of the actuator. Further, in Examples 8 and 9 in which the intermediate layer was constituted by a material containing a colorant so as to have a concealing property, the deformed direction could be favorably determined.

On the other hand, in the case of Comparative Example, satisfactory results could not be obtained. That is, in Comparative Example, the deformation was not caused. This is considered to be because the intermediate layer is not provided between the first deformable material layer and the second deformable material layer so that a large electric current flows between the first deformable material layer and the second deformable material layer, and therefore, the oxidation-reduction reaction cannot be controlled.

REFERENCE SINGS LIST

A: unit A, B: unit B, C: unit C, D: unit D, 200: driving device, 100: actuator, 10: power source, 11: first deformable material layer, 12: second deformable material layer, 12a: anion, 12b: solvent molecule, 13: intermediate layer, 14: switch

The invention claimed is:
1. An actuator, comprising:
a first deformable material layer;
a second deformable material layer; and
an intermediate layer provided between the first deformable material layer and the second deformable material layer, wherein
the first deformable material layer includes a first deformable material containing a first stimulus-responsive compound, which changes its molecular structure and also its color tone according to an oxidation-reduction reaction, a first polymeric material, a first electronically conductive substance having a light transmitting property, and a first electrolyte,
the second deformable material layer includes a second deformable material containing a second stimulus-responsive compound, which changes its molecular structure and also its color tone according to an oxidation-reduction reaction, a second polymeric material, a second electronically conductive substance having a light transmitting property, and a second electrolyte, and the intermediate layer inhibits electron transfer between the first deformable material layer and the second deformable material layer.

2. The actuator according to claim 1, wherein the first electronically conductive substance and/or the second electronically conductive substance include/includes one member or two or more members selected from the group consisting of ITO, IZO, GZO, ZnO, CdO, AZO, and IGZO.

3. The actuator according to claim 1, wherein the first electronically conductive substance and/or the second electronically conductive substance are/is in the form of a particle.

4. The actuator according to claim 3, wherein the first electronically conductive substance and/or the second electronically conductive substance have/has an average particle diameter of 5 nm or more and 10 μm or less.

5. The actuator according to claim 1, wherein the first stimulus-responsive compound and/or the second stimulus-responsive compound include/includes:

a unit A which has a bond functioning as a rotation axis;
a first unit B which is disposed at a first bonding site of the unit A; and
a second unit B which is disposed at a second bonding site of the unit A, and
the first unit B and the second unit B are bonded to each other by a reduction reaction.

6. The actuator according to claim 5, wherein the unit A is one member selected from the group consisting of the following formula (1), the following formula (2), and the following formula (3):

[Chem. 1]

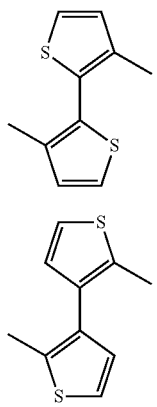

(1)

(2)

-continued

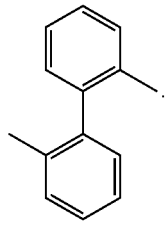

(3)

7. The actuator according to claim 5, wherein the first unit B and the second unit B are each a group represented by the following formula (4):

[Chem. 2]

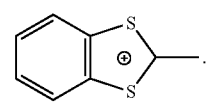

(4)

8. The actuator according to claim 1, wherein the first polymeric material and/or the second polymeric material include/includes one member or two or more members selected from the group consisting of a vinylidene fluoride-propylene hexafluoride copolymer, poly(methyl (meth)acrylate), and an organic electrolyte oligomer.

9. The actuator according to claim 1, wherein the first polymeric material and/or the second polymeric material include/includes a liquid crystal polymer.

10. The actuator according to claim 9, wherein the liquid crystal polymer is obtained by cross-linking with a cross-linking agent.

11. The actuator according to claim 9, wherein the first stimulus-responsive compound and/or the second stimulus-responsive compound include/includes a functional group having liquid crystallinity, and the liquid crystal polymer has the same functional group as that of the stimulus-responsive compound.

12. The actuator according to claim 1, wherein the first stimulus-responsive compound and/or the second stimulus-responsive compound include/includes a functional group having liquid crystallinity.

13. The actuator according to claim 12, wherein the functional group having liquid crystallinity has a plurality of ring structures, and
one or more halogen atoms are bonded to one of the plurality of ring structures.

14. The actuator according to claim 1, wherein the intermediate layer is in the form of a gel.

15. The actuator according to claim 1, wherein the intermediate layer includes an ion exchanger which exchanges anions.

* * * * *